(12) United States Patent
Takaoka

(10) Patent No.: US 7,295,354 B2
(45) Date of Patent: Nov. 13, 2007

(54) IMAGE PROCESSING APPARATUS AND CONTROL METHOD THEREOF

(75) Inventor: Tatsuo Takaoka, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1067 days.

(21) Appl. No.: 10/378,718

(22) Filed: Mar. 4, 2003

(65) Prior Publication Data

US 2003/0184822 A1 Oct. 2, 2003

(30) Foreign Application Priority Data

Mar. 4, 2002 (JP) .............................. 2002-057032
Nov. 29, 2002 (JP) .............................. 2002-347141

(51) Int. Cl.
*H04N 1/04* (2006.01)
*H04N 1/00* (2006.01)

(52) U.S. Cl. ...................... 358/498; 358/496; 358/408; 358/474

(58) Field of Classification Search ................ 358/498, 358/496, 408, 474, 488; 399/367; 271/3.04; 355/18, 23
See application file for complete search history.

(56) References Cited

U.S. PATENT DOCUMENTS

| 4,924,324 | A | | 5/1990 | Takaoka | |
| 4,975,783 | A | | 12/1990 | Takaoka | |
| 5,103,318 | A | | 4/1992 | Takaoka | |
| 5,247,370 | A | | 9/1993 | Takaoka | |
| 5,986,775 | A | * | 11/1999 | Yoshimizu | ................... 358/496 |
| 6,333,795 | B1 | * | 12/2001 | Kaji | ........................... 358/474 |
| 6,400,472 | B1 | * | 6/2002 | Yoshimizu | ................... 358/498 |

FOREIGN PATENT DOCUMENTS

| JP | 62-239172 | 10/1987 |
| JP | 10-13657 | 1/1998 |

OTHER PUBLICATIONS

Copending U.S. Appl. No. 09/751,253, filed Dec. 28, 2000.
Copending U.S. Appl. No. 09/538,417, filed Mar. 29, 2000.
Japanese offcial action dated Feb. 13, 2007 in corresponding Japanese patent application No. 2002-347141.

* cited by examiner

Primary Examiner—Jerome Grant
Assistant Examiner—Houshang Safaipour
(74) Attorney, Agent, or Firm—Cooper & Dunham, LLP

(57) ABSTRACT

An image processing apparatus and a control method thereof are provided. When both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc., can be tremendously reduced. Therefore, the reading operation becomes very convenient.

23 Claims, 18 Drawing Sheets

IMAGE PROCESSING APPARATUS AND CONTROL METHOD THEREOF

BACKGROUND

1. Field

This invention relates in general to an image processing apparatus and a method for controlling such apparatus. The image processing apparatus comprises an automatic document feeder for automatically conveying and for separating the manuscript (document) with a plurality of pages set on a tray. The image processing apparatus also comprises an image processor for reading and storing an image of the manuscript separated by the automatic document feeder.

2. Description of Related Art

In general, the apparatus comprising an automatic document feeder for conveying and separating a manuscript with a plurality of pages, and an image processor for reading and storing an image of the manuscript separated by the automatic document feeder, is commercially available. However, such an apparatus, for example a low-cost facsimile apparatus, cannot handle a large amount of manuscripts at one time.

Conventionally, for example, following method is used when a user wants to send a large amount of manuscripts. First, the user divides the large amount of manuscripts into a plurality of manuscript sets. Next, the user places first manuscript set on the automatic document feeder, then the facsimile apparatus reads the first manuscript set, thus the first image file for the first manuscript set is generated. The user repeats such operation for all remaining the divided manuscript sets, thus a plurality of image data files for all the manuscript set are generated. Then, the plurality of the image data files is combined into a single image data file. Then, the combined image data file is transmitted.

Alternatively, following method is used. A plurality of image data files to the same destination are consecutively transmitted in the same communication. Such communication with a plurality of image data files is so called as a "multiple file transmission function". By using this method, a plurality of image data files obtained by a lot of plural reading operations can be consecutively sent to the same destination. In this way, a large amount of transmission manuscripts can be sent to the same destination.

However, in the conventional apparatus mentioned above, difficulties may occur in operations when many double-sided manuscripts with two recording sides are transmitted.

SUMMARY

According to the foregoing description, an object of this invention is to provide an image processing apparatus that is very convenient when reading a large amount of double-sided manuscripts and a method for controlling the image processing apparatus.

According to the object(s) mentioned above, the present invention provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of both sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as setting back sides of a next manuscript set within a prescribed time from the end of a manuscript reading operation for one manuscript set is confirmed, a reading operation for the next manuscript set is executed. When setting the next manuscript set is not confirmed with a prescribed time from the end of the manuscript reading operation, a back side reading operation of the double-sided manuscript reading mode is executed. In the back side reading operation, as setting back sides of the next manuscript set within the prescribed time from an end of the manuscript reading operation for back sides of the one manuscript set is confirmed, the back side reading operation for the next manuscript set is executed.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a first guidance message to prompt a user to set a next manuscript set is displayed, and then as setting the next manuscript set within a prescribed time from starting, displaying the first guidance message, a reading operation for the next manuscript set is executed. When setting the next manuscript set within the prescribed time from starting, displaying the first guidance message is not confirmed, a second guidance message to prompt the user to set back sides of the one manuscript set on the manuscript input tray is displayed, and then a back side reading operation of the double-sided manuscript reading mode is executed. In the back side reading operation, as the manuscript reading operation for back sides of the one manuscript set is finished, a third guidance message to prompt a user to set back sides of a next manuscript set is displayed, and then as setting the back sides of the next manuscript set is confirmed with a prescribed time from starting, displaying the third guidance message, a reading operation for the back sides of the next manuscript set is executed.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, a manuscript reading operation for one manuscript set is finished, a next manuscript set is set and a first guidance message to prompt a user with a finished and confirmed operation setting is displayed, and then as the input of the finished and confirmed operation is detected within a prescribed time from starting, displaying the first guidance message, a reading operation for a next manuscript set is executed. When the input of the finished and confirmed operation is not detected within a prescribed time from starting, displaying the first guidance message, back sides of the one manuscript set are set on the manuscript input tray and a second guidance message to prompt the user with a finished and confirmed operation is displayed, a back side reading operation of the double-sided manuscript reading mode is executed. In the back side reading operation, as the manuscript reading operation for back sides of the one manuscript set is finished, back sides of a next manuscript set are set and a third guidance message to prompt a user with a finished and confirmed operation setting is displayed, and then as the input of the finished and confirmed operation is detected within a prescribed time from starting, displaying the third guidance message, a back side reading operation for a next manuscript set is executed.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed, and then as the input of the finished and confirmed operation is detected within a prescribed time from starting, displaying the first guidance message, a reading operation for a next manuscript set is executed. When the input of the finished and confirmed operation is not detected or the message of finishing the reading of the final manuscript set is detected within a prescribed time from starting, displaying the first guidance message, back sides of an initial manuscript set are set on the manuscript input tray and a second guidance message to prompt the user with a finished and confirmed operation is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed, or that the next manuscript set is the final manuscript set is displayed. And then as the input of the finished and confirmed operation is detected within a prescribed time from starting, displaying the third guidance message, a back side reading operation for a next manuscript set is executed. When the input of the finished and confirmed operation is not detected within the prescribed time from starting, displaying the third guidance message, or the message that the next manuscript set is the final manuscript set is detected, the reading operation is finished.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a reading operation at this time is terminated with errors and image data that have been read and stored till now are erased. When the message that the next manuscript set is the final manuscript set is detected within a prescribed time from starting, displaying the first guidance message, back sides of an initial manuscript set are set on the manuscript input tray and a second guidance message to prompt the user with a message that the operation is finished and confirmed is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message of finished and confirmed operation setting or of final manuscript set, the reading of the final manuscript set is displayed, and then as an input of the finished and confirmed operation is detected within a prescribed time from starting, displaying the third guidance message, a back side reading operation for a next manuscript set is executed. When the input of the finished and confirmed operation is not detected within the prescribed time from starting, displaying the third guidance message, a reading operation at this time is terminated with errors and image data that have been read and stored till now are erased. When the message of finishing the reading of the final manuscript set is detected within a prescribed time from starting, displaying the third guidance message, the reading operation is finished.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript is displayed. And then as the input of the finished and confirmed operation is detected within a prescribed time from starting, displaying the first guidance message, a reading operation for a next manuscript set is executed. When the input of the finished and confirmed operation is not detected or the message of finishing the reading of the final manuscript set is detected within a prescribed time from starting, displaying the first guidance message, back sides of an initial manuscript set are set on the manuscript input tray. A second guidance message to prompt the user with a finished and confirmed operation setting is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed, or that the next manuscript set is the final manuscript is displayed. Then as the input of the finished and confirmed operation is detected within a prescribed time from starting, displaying the third guidance message, a back side reading operation for a next manuscript set is executed. As the input of the finished and confirmed operation is not detected within the prescribed time from starting, displaying the third guidance message, the reading operation is finished.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a reading operation at this time is terminated with errors and image data that have been read and stored till now are erased. When the message of finishing the reading of the final manuscript set is detected within a prescribed time from starting, displaying the first guidance message, back sides of an initial manuscript set are set on the manuscript input tray and a second guidance message to prompt the user with a finished and confirmed operation setting is displayed. Then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed is displayed. Then as the input of the finished and confirmed operation is detected within a prescribed time from starting, displaying the third guidance message, a back side reading operation for a next manuscript set is executed. When the input of the finished and confirmed operation is not detected within the prescribed time from starting, displaying the third guidance message, a reading operation at this time is terminated with errors and image data that have been read and stored till now are erased.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message of finished and confirmed operation setting or of a final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a second guidance message to prompt a user to select as to whether a document is to be erased is displayed, and when the user specifies a message to erase the document in response to the second guidance message, a reading operation at this time is terminated with errors and image data that have been read and stored till now are erased. When the message of finishing the reading of the final manuscript set is detected within a prescribed time from starting, displaying the first guidance message, or the user does not specify the message to erase the document in response to the second guidance message, back sides of an initial manuscript set are set on the manuscript input tray. Then a third guidance message to prompt the user with a finished and confirmed operation setting is displayed, and then a back side reading operation of the double-sided manuscript reading mode is executed. In the back side reading operation, as the manuscript reading operation for back sides of the one manuscript set is finished, back sides of a next manuscript set are set. Then a fourth guidance message to prompt a user to input a message indicating that the operation is finished and confirmed, or that the next manuscript set is the final manuscript set is displayed. Then as the input of the finished and confirmed operation is detected within a prescribed time from starting, displaying the fourth guidance message, a back side reading operation for a next manuscript set is executed. When the input of the finished and confirmed operation is not detected within the prescribed time from starting, displaying the third guidance message, a fifth guidance message to prompt a user to select as to whether a document is to be erased is displayed. And when the user specifies the message to erase the document in response to the fifth guidance message, a reading operation at this time is terminated with errors and image data that have been read and stored till now are erased. When the message of finishing the reading of the final manuscript set is detected within a prescribed time from starting, displaying the fourth guidance message or the user does not specify the message to erase the document in response to the fifth guidance message, the reading operation is finished.

The present invention further provides an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. When both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message of finished and confirmed operation setting or finishing a reading of a final manuscript set is displayed. Then as input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a second guidance message to prompt a user to select as to whether a document is to be erased is displayed. When the user specifies a message to erase the document in response to the second guidance message, a reading operation at this time is terminated with errors and image data that have been read and stored till now are erased. When the message of finishing the reading of the final manuscript set is detected within a prescribed time from starting, displaying the first guidance message, back sides of an initial manuscript set are set on the manuscript input tray and a third guidance message to prompt the user with a finished and confirmed operation is displayed. Then a back side reading operation of the double-sided manuscript reading mode is executed. In the back side reading operation, as the manuscript reading operation for back sides of the one manuscript set is finished, back sides of a next manuscript set are set and a fourth guidance message to prompt a user to input a message of finished and confirmed operation setting is displayed. Then as an input of the finished and confirmed operation is detected within a prescribed time from starting, displaying the fourth guidance message, a back side reading operation for a next manuscript set is executed. When the input of the finished and confirmed operation is not detected within the prescribed time from starting, displaying the third guidance message, a fifth guidance message to prompt a user to select as to whether a document is to be erased is displayed. When the user specifies the message to erase the document in response to the fifth guidance message, a reading operation at this time is terminated with errors and image data that have been read and stored till now are erased. When the user does not specify the message to erase the document in response to the fifth guidance message, the reading operation is finished.

In the above examples of image processing apparatuses, in the back side reading operation, whether a number of back sides of the manuscript set and a number of corresponding front sides of the manuscript set are consistent is checked, and when the numbers of the front and the back sides are consistent, the reading operation continues; otherwise the reading operation at this time is terminated with errors and image data that have been read and stored till now are erased.

In the above examples of image processing apparatuses, in the back side reading operation, whether a number of back sides of the manuscript set and a number of corresponding front sides of the manuscript set are consistent is checked, and when the numbers of the front and the back sides are consistent, the reading operation continues. When the numbers of the front and the back sides are not consistent, a guidance message to prompt a user to select as to whether a document is to be erased is displayed. When the user specifies the message to erase the document in response to the fifth guidance message, a reading operation at this time is terminated with errors and image data that have been read and stored till now are erased. When the user does not specify the message to erase the document in response to the guidance message, the reading operation continues.

In the above examples of image processing apparatuses, when a specified additional manuscript is added to a front page, the front page and other manuscripts are handled separately, and image data obtained by reading the front page are handled separately.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as setting back sides of a next manuscript set within a prescribed time from an end of a manuscript reading operation for one manuscript set is confirmed, a reading operation for a next manuscript set is executed. When setting the next manuscript set is not confirmed with a prescribed time from an end of the manuscript reading operation, a back side reading operation of the double-sided manuscript reading mode is executed. In the back side reading operation, as setting back sides of the next manuscript set within the prescribed time from an end of the manuscript reading operation for back sides of the one manuscript set is confirmed, the back side reading operation for the next manuscript set is executed.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a first guidance message to prompt a user to set a next manuscript set is displayed, and then as setting the next manuscript set within a prescribed time from starting, displaying the first guidance message, a reading operation for the next manuscript set is executed. When setting the next manuscript set within the prescribed time from starting, displaying the first guidance message is not confirmed, a second guidance message to prompt the user to set back sides of the one manuscript set on the manuscript input tray is displayed, and then a back side reading operation of the double-sided manuscript reading mode is executed. In the back side reading operation, as the manuscript reading operation for back sides of the one manuscript set is finished, a third guidance message to prompt a user to set back sides of a next manuscript set is displayed. Then as setting the back sides of the next manuscript set is confirmed with a prescribed time from starting, displaying the third guidance message, a reading operation for the back sides of the next manuscript set is executed.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user with a finished and confirmed operation setting is displayed. Then as the input of the finished and confirmed operation is detected within a prescribed time from starting, displaying the first guidance message, a reading operation for a next manuscript set is executed. When the input of the finished and confirmed operation is not detected within a prescribed time from starting, displaying the first guidance message, back sides of the one manuscript set are set on the manuscript input tray and a second guidance message to prompt the user with a finished and confirmed operation setting is displayed, a back side reading operation of the double-sided manuscript reading mode is executed. In the back side reading operation, as the manuscript reading operation for back sides of the one manuscript set is finished, back sides of a next manuscript set are set and a third guidance message to prompt a user with a finished and confirmed operation setting is displayed. Then as input of the finished and confirmed operation is detected within a prescribed time from starting displaying the third guidance message, a back side reading operation for a next manuscript set is executed.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When the input of the finished and confirmed operation is not detected or the message of finishing the reading of the final manuscript set is detected within a prescribed time from starting, displaying the first guidance message, back sides of an initial manuscript set are set on the manuscript input tray. And a second guidance message to prompt the user with a finished and confirmed operation is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed, or that the next manuscript set is the final manuscript set is displayed. Then as the input of the finished and confirmed operation is detected within a prescribed time from starting, displaying the third guidance message, a back side reading operation for a next manuscript set is executed. When the input of the finished and confirmed operation is not detected within the prescribed time from starting, displaying the third guidance message or the message of finishing the reading of the final manuscript set is detected, the reading operation is finished.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that a reading of a final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a reading operation at this time is terminated with errors and image data that have been read and stored till now are erased. When the message of finishing the reading of the final manuscript set is detected within a prescribed time from starting, displaying the first guidance message, back sides of an initial manuscript set are set on the manuscript input tray and a second guidance message to prompt the user with a finished and confirmed operation is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed, or that the next manuscript set is the final manuscript set is displayed. Then as the input of the finished and confirmed operation is detected within a prescribed time from starting, displaying the third guidance message, a back side reading operation for a next manuscript set is executed. When input of the finished and confirmed operation is not detected within the prescribed time from starting, displaying the third guidance message, a reading operation at this time is terminated with errors and image data that have been read and stored till now are erased. When the message of finishing the reading of the final manuscript set is detected within a prescribed time from starting, displaying the third guidance message, the reading operation is finished.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When the input of the finished and confirmed operation is not detected or the message of finishing the reading of the final manuscript set is detected within a prescribed time from starting, displaying the first guidance message, back sides of an initial manuscript set are set on the manuscript input tray. And a second guidance message to prompt the user with a finished and confirmed operation setting is displayed, and then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message indicating that the operation is finished and confirmed, or that the next manuscript set is the final manuscript set is displayed. Then as the input of the finished and confirmed operation is detected within a prescribed time from starting, displaying the third guidance message, a back side reading operation for a next manuscript set is executed. When the input of the finished and confirmed operation is not detected within the prescribed time from starting displaying the third guidance message, the reading operation is finished.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a reading operation at this time is terminated with errors and image data that have been read and stored till now are erased. When the message of finishing the reading of the final manuscript set is detected within a prescribed time from starting, displaying the first guidance message, back sides of an initial manuscript set are set on the manuscript input tray and a second guidance message to prompt the user with a finished and confirmed operation is displayed. Then a back side reading operation of the double-sided manuscript reading mode is executed. In the back side reading operation, as the manuscript reading operation for back sides of the one manuscript set is finished, back sides of a next manuscript set are set and a third guidance message to prompt a user to input a message of finished and confirmed operation setting is displayed. Then as the input of the finished and confirmed operation is detected within a prescribed time from starting, displaying the third guidance message, a back side reading operation for a next manuscript set is executed. When the input of the finished and confirmed operation is not detected within the prescribed time from starting, displaying the third guidance message, a reading operation at this time is terminated with errors and image data that have been read and stored till now are erased.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a second guidance message to prompt a user to select as to whether a document is to be erased is displayed. When the user specifies a message to erase the document in response to the second guidance message, a reading operation at this time is terminated with errors and image data that have been read and stored till now are erased. When the message of finishing the reading of the final manuscript set is detected within a prescribed time from starting, displaying the first guidance message or the user does not specify the message to erase the document in response to the second guidance message, back sides of an initial manuscript set are set on the manuscript input tray. And a third guidance message to prompt the user with a finished and confirmed operation setting is displayed, and then a back side reading operation of the double-sided manuscript reading mode is executed. In the back side reading operation, as the manuscript reading operation for back sides of the one manuscript set is finished, back sides of a next manuscript set are set and a fourth guidance message to prompt a user to input a message indicating that the operation is finished and confirmed, or that the next manuscript set is the final manuscript set is displayed. Then as the input of the finished and confirmed operation is detected within a prescribed time from starting, displaying the fourth guidance message, a back side reading operation for a next manuscript set is executed. When the input of the finished and confirmed operation is not detected within the prescribed time from starting, displaying the third guidance message, a fifth guidance message to prompt a user to select as to whether a document is to be erased is displayed. When the user specifies the message to erase the document in response to the fifth guidance message, a reading operation at this time is terminated with errors and image data that have been read and stored till now are erased. When the message of finishing the reading of the final manuscript set is detected within a prescribed time from starting, displaying the fourth guidance message or the user does not specify the message to erase the document in response to the fifth guidance message, the reading operation is finished.

The present invention further provides a method for controlling an image processing apparatus, comprising a manuscript automatic conveying function for separating one by one a plurality of manuscripts to be read that are set on a manuscript input tray; and an image processing function for reading and storing single-sided images of the plurality of the manuscripts separated by the manuscript automatic conveying function. In operation, the image processing apparatus comprises a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts. Regarding the control method, when both the successive manuscript reading mode and the double-sided manuscript reading mode are set, a successive manuscript reading operation is performed for back sides after a double-sided manuscript reading operation for front sides is finished. In the successive manuscript reading operation, as a manuscript reading operation for one manuscript set is finished, a next manuscript set is set and a first guidance message to prompt a user to input a message indicating that the operation is finished and confirmed, or that the next manuscript set is the final manuscript set is displayed. Then as the input of the finished and confirmed operation is detected within a prescribed time from starting, displaying the first guidance message, a reading operation for a next manuscript set is executed. When input of the finished and confirmed operation is not detected within a prescribed time from starting, displaying the first guidance message, a second guidance message to prompt a user to select as to whether a document is to be erased is displayed, and when the user specifies a message to erase the document in response to the second guidance message, a reading operation at this time is terminated with errors and image data that have been read and stored till now are erased. When the message of finishing the reading of the final manuscript set is detected within a prescribed time from starting, displaying the first guidance message, back sides of an initial manuscript set are set on the manuscript input tray and a third guidance message to prompt the user with a finished and confirmed operation setting is displayed, and then a back side reading operation of the double-sided manuscript reading mode is executed. In the back side reading operation, as the manuscript reading operation for back sides of the one manuscript set is finished, back sides of a next manuscript set are set and a fourth guidance message to prompt a user to input a message of finished and confirmed operation setting. Then as the input of the finished and confirmed operation is detected within a prescribed time from starting, displaying the fourth guidance message, a back side reading operation for a next manuscript set is executed. When the input of the finished and confirmed operation is not detected within the prescribed time from starting, displaying the third guidance message, a fifth guidance message to prompt a user to select as to whether a document is to be erased is displayed, and when the user specifies the message to erase the document in response to the fifth guidance message, a reading operation at this time is terminated with errors and image data that have been read and stored till now are erased. When the user does not specify the message to erase the document in response to the fifth guidance message, the reading operation is finished.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF PREFERRED EMBODIMENTS

Figure 1:
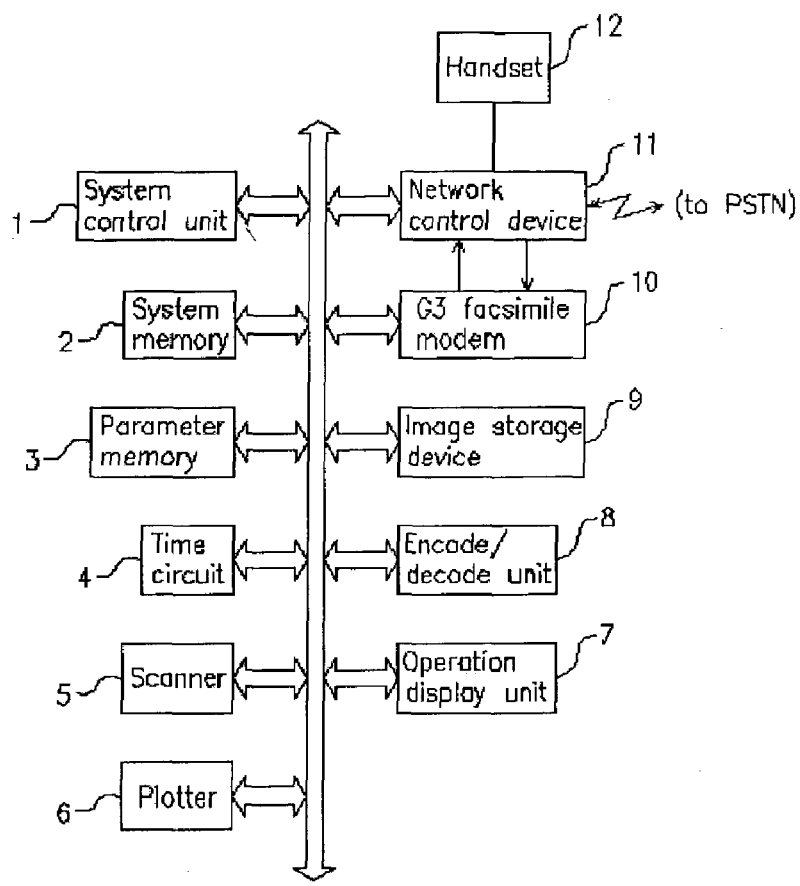
FIG. 1 shows a G3 facsimile apparatus according to one embodiment of the present invention.

The embodiments according to the present invention are described in detail with references to attached drawings. FIG. 1 shows a G3 facsimile apparatus according to one embodiment of the present invention.

Referring to FIG. 1, a system control unit 1 is used to perform a control process for each part of the G3 facsimile apparatus and a preset G3 facsimile transmission control process. A system memory 2 stores a control program for executing the system control unit 1 and various required data when executing the control program, etc., and also forms a work area of the system control unit 1. A time circuit 4 is for outputting current time information.

A scanner 5 is used for reading a manuscript image with a preset resolution and has a manuscript automatic conveying function for separating a plurality of manuscript set on a manuscript input tray (not shown). A plotter 6 is used for recording and outputting an image with the preset resolution. An operation display unit 7 is used for operating the G3 facsimile apparatus and comprise various operation keys and various displays.

An encode/decode unit 8 is used to encode and compress an image signal and alternatively, used to decode the encoded and compressed image information to the original image signal. An image storage apparatus 9 is used for storing image information that is encoded and compressed.

A G3 facsimile modem 10 is used to implement a modem function of the G3 facsimile apparatus, and comprises a low speed modem function for exchanging transmission process signals (V. 21 modem) and a high speed modem function for exchanging image information mainly (V. 17 modem, V. 34 modem, V. 29 modem, and V. 27 ter modem, etc.)

A network control apparatus 11 is used for connecting the G3 fascimile apparatus to analogue Public Switched Telephone Networks (PSTN), and comprises an automatic sending and receiving function. In addition, a handset 12 used in communication is set to the network control apparatus 11.

The system control unit 1, the system memory 2, the parameter memory 3, the time circuit 4, the scanner 5, the plotter 6, the operation display 7, the encode/decode unit 8, the image storage apparatus 9, the G3 facsimile 10 and the network control apparatus 11 are connected to an internal bus 13. Data exchange between the above elements is executed through the internal bus 13 mainly. In addition, data exchange between the network control apparatus 11 and the G3 facsimile modem 10 is directly executed.

Figure 2:
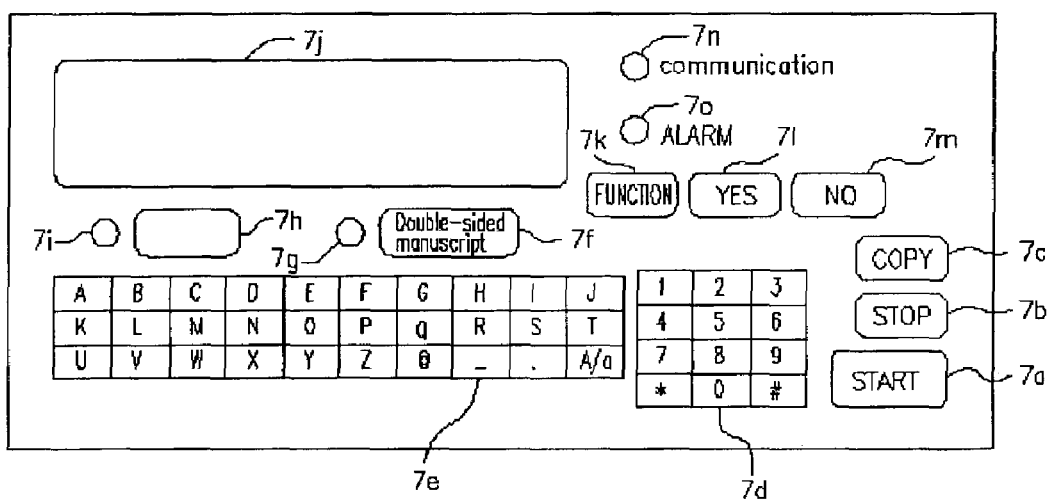
FIG. 2 shows an example of the operation display shown in FIG. 1.

FIG. 2 shows an example of the operation display shown in FIG. 1. Referring to FIG. 2, a START key 7a is used to input an instruction to start a transmitting and receiving operation of the G3 facsimile apparatus. A STOP key 7b is used to input an instruction to stop operations of the G3 facsimile apparatus. A COPY key 7c is used to input an instruction to start a copy operation of the G3 facsimile apparatus. Numeral keys 7d are used to input digit information such as a telephone number.

One-touch dial keys 7e are operated to input a destination number key by key and are used to input texts, etc. that form various registration information for the G3 facsimile apparatus. A double-sided manuscript key 7f is operated when a double-sided manuscript reading mode (to be described in following contents) is specified. A lamp 7g is used to display a message that the double-sided manuscript key 7f is operated and the double-sided manuscript reading mode is selected. A successive manuscript key 7h is operated when a successive manuscript reading mode (will be described in following contents) is specified. A lamp 7i is used to display a message that the successive manuscript key 7h is operated and the successive manuscript reading mode is selected.

A liquid crystal display 7j is used to display an operation guidance of the G3 facsimile apparatus and various messages. The display 7j is also used to indicate the contents of input information. A function key 7k is used to activate a functional operation when each of various functions (for example, data registration to the one-touch dial keys 7e) of the G3 facsimile apparatus will be performed. A YES key 71 is used to input a positive answer in response to a guidance message displayed on the liquid crystal display 7j. A NO key 7m is used to input a negative answer in response to a guidance message displayed on the liquid crystal display 7j. A lamp 7n is used to indicate that a communication job is currently processed when the lamp 7n is lit. A lamp 7o is lit to warn a status that any anomaly occurs.

In this embodiment, the user of the G3 facsimile apparatus selects three modes, successive manuscript reading mode, double-sided manuscript reading mode, and successive and double-sided manuscript reading mode. In successive manuscript reading mode, the G3 facsimile apparatus reads and inputs a large amount of manuscripts to be read by plural times. In this mode, the user applies a first set of manuscript to the G3 facsimile apparatus. After the G3 facsimile apparatus finishes reading of the first set of manuscript, the G3 apparatus facsimile apparatus generates an image file for the first set of manuscript. Then, the user applies a second set of manuscript and adds it to the end of the image file for the first set of manuscript.

Figure 3:
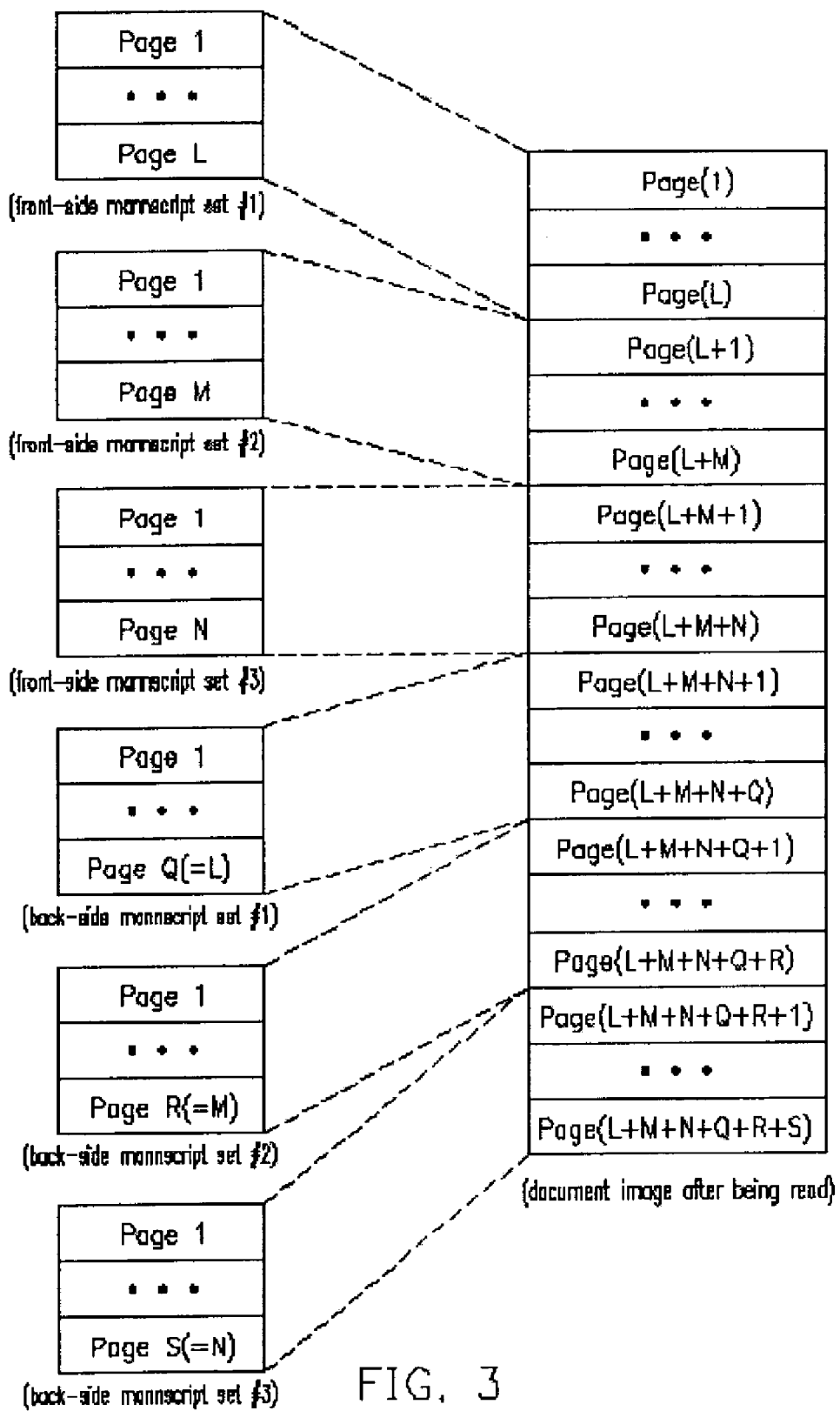
FIG. 3 shows an exemplary page order of document image data during reading.

For example, the manuscripts to be read are divided into three manuscript sets, such as manuscript sets #1, #2 and #3, in which front side of the manuscript sets #1, #2 and #3 comprises L pages, M pages and N pages respectively, and back side of the manuscript sets #1, #2 and #3 comprises Q (=L) pages, R (=M) pages and S (=N) pages of back side respectively. As shown in FIG. 3, when both the successive manuscript reading mode and the double-sided manuscript reading mode are specified, a front side reading operation for the manuscript set #1, a front side reading operation for the manuscript set #2, a front side reading operation for the manuscript set #3, a back side reading operation for the manuscript set #1, a back side reading operation for the manuscript set #2, and a back side reading operation for the manuscript set #3 are performed, and therefore, an image data file comprising a transmission manuscript with (L+M+N+Q+R+S) pages is formed.

Figure 4:
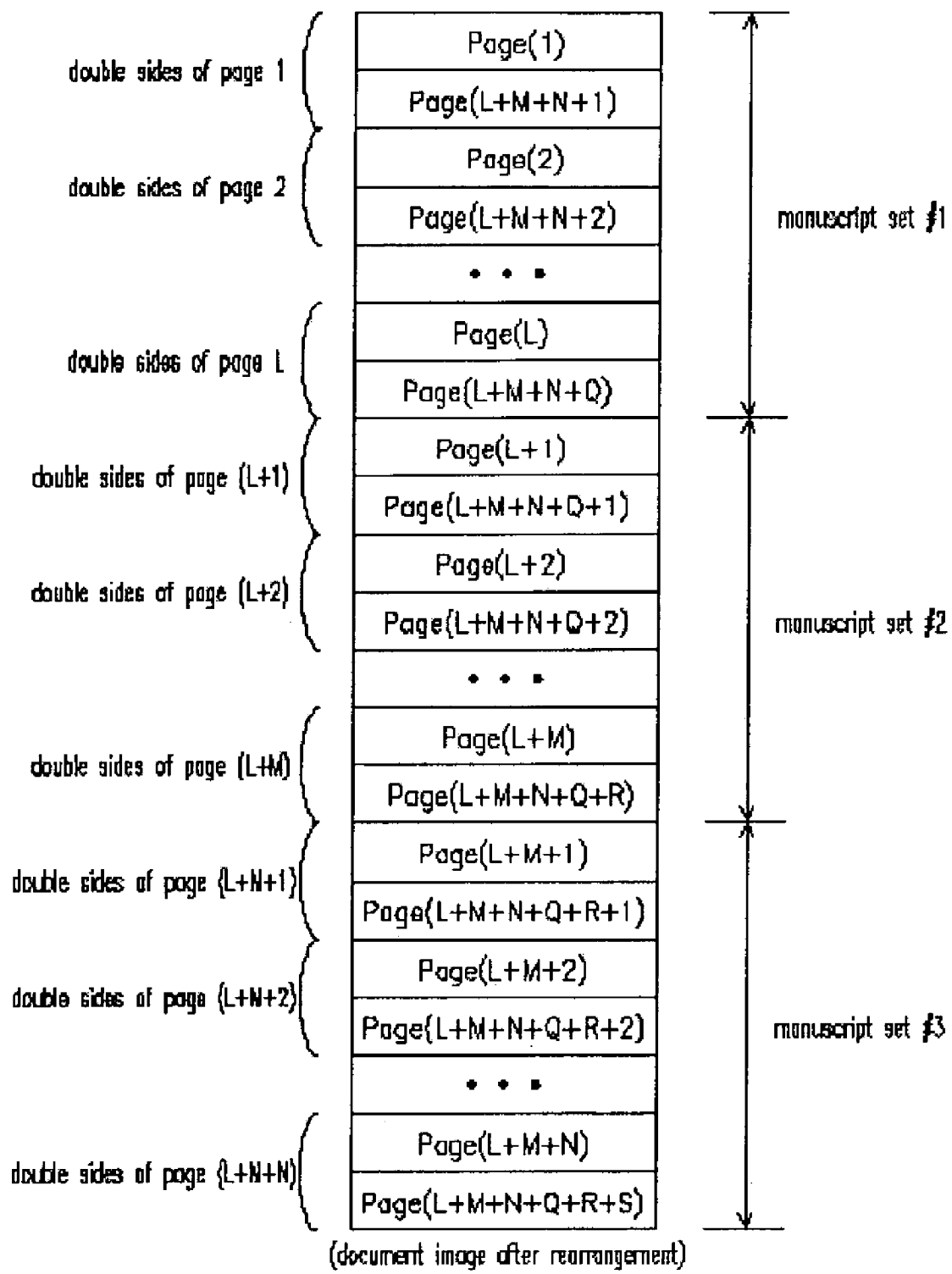
FIG. 4 shows an example of document image data when page order in FIG. 3 is rearranged.

At first, the front sides of the manuscript sets are consecutively read (successive manuscript reading mode), and then the back sides of the manuscript sets are consecutively read. In this way, pages of image data obtained by the above reading operations are further arranged as shown in FIG. 4, and then the arranged pages are transmitted. Namely, the page order after being rearranged is arranged in such a manner that the front side and the back side of each page are continuous with an order of the front side of the first page of the manuscript set, the back side of the first page of the manuscript set, the front side of the second page of the manuscript set, the back side of the second page of the manuscript set, etc.

FIG. 5 and FIG. 6 show examples of a display screen that is displayed on the liquid crystal display 7j of the operation display 7. In addition, the display screen, for example, is information that is displayed by properly selecting in manuscript reading process described as follows. FIG. 5A is a standby display screen. The manuscripts to be transmitted are set under this situation. As a destination is selected by the one-touch keys 7e of the operation display unit 7, the display screen in FIG. 5A is changed to a display screen shown in FIG. 5B. In addition, FIG. 5C is a display screen indicating that the manuscript reading is in process. FIG. 5D is a display screen with a guidance message to prompt the user to press the START key 7a as the manuscripts are set. FIG. 5E a display screen with a guidance message to prompt the user to press the START key 7a as the manuscripts are set, or to press a "#" key that represents a manuscript end. FIG. 5F is a display screen with a guidance message indicating that manuscripts can be set.

Figure 6A:
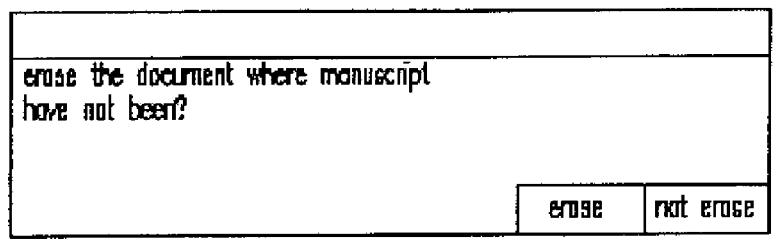
FIG. 6 is another example of a display image that is displayed on the liquid crystal display of the operation display.
Figure 6B:
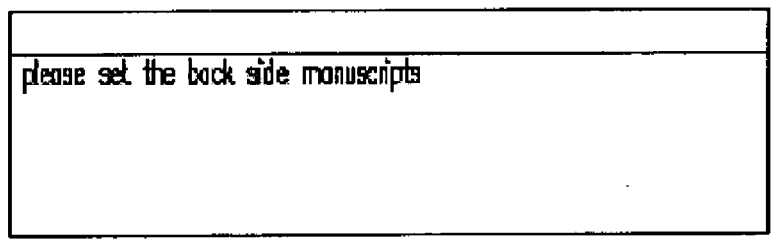
Figure 6C:
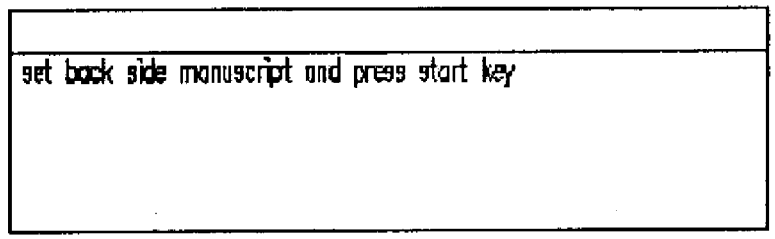
Figure 6D:
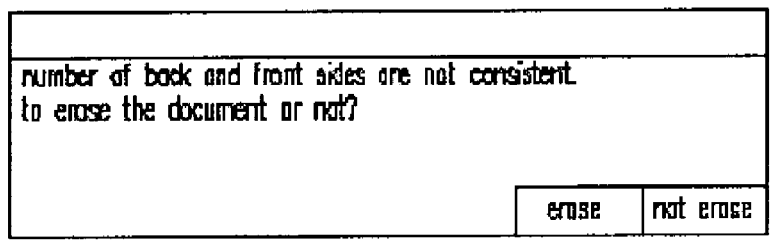

FIG. 6A shows a display screen with a guidance message to inquire whether a document is to be erased, such as "erase the document where the manuscripts have not been set?". FIG. 6B is display screen with a guidance message when the double-sided reading mode moves to reading the back sides of the manuscript sets. FIG. 6C shows a display screen with a guidance message to prompt setting the back sides of the manuscripts and pressing the "START" key. FIG. 6D shows a display screen with a guidance message to prompt a confirmation of erasing the document when the read pages of the back sides are inconsistent with the pages of the front sides of the corresponding manuscript set.

Figure 7:
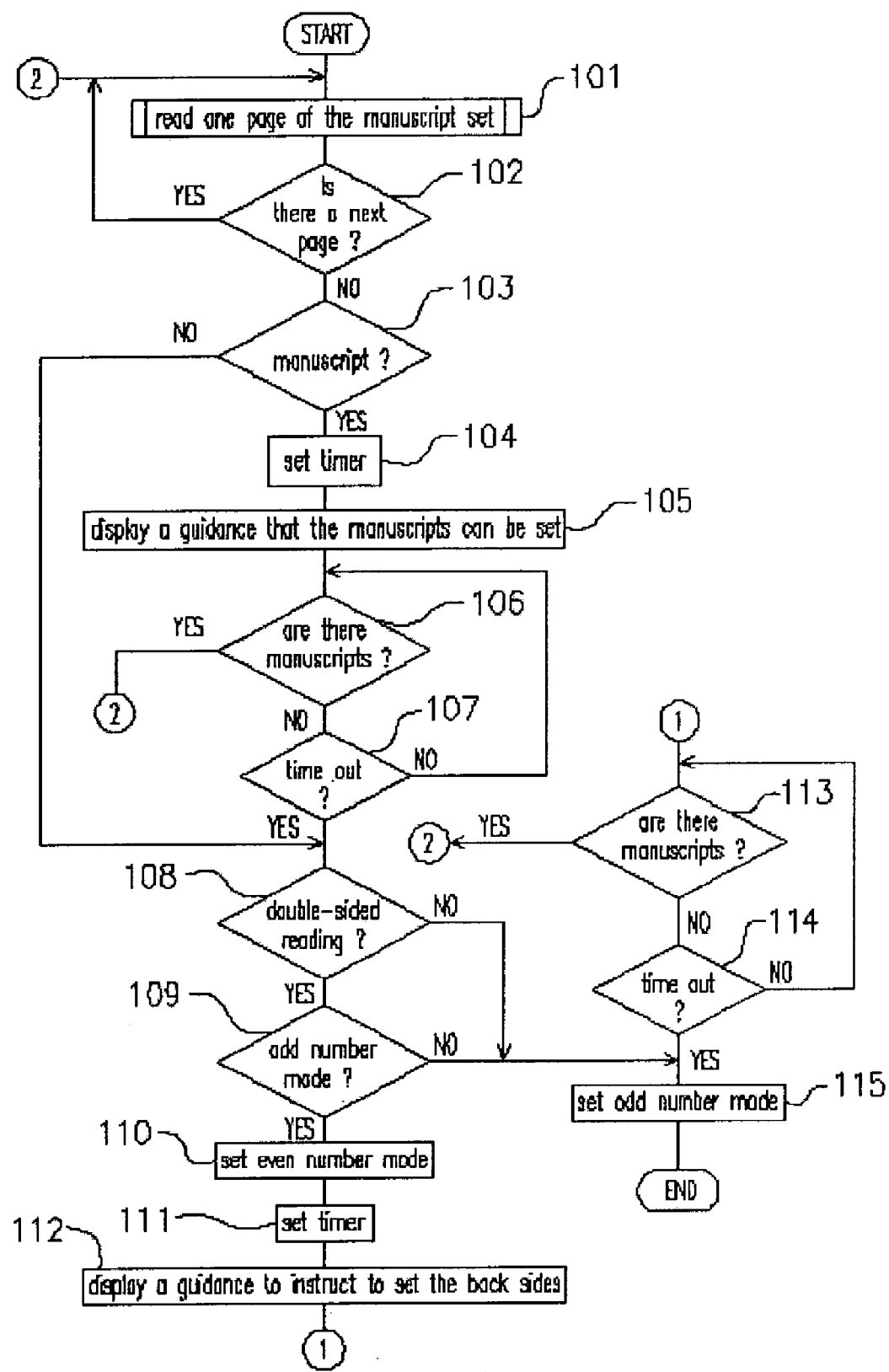
FIG. 7 is an example of a manuscript reading process.

FIG. 7 is an example of a manuscript reading process. Because the embodiment has double-sided manuscript reading mode, it is necessary to be able to recognize that the currently reading manuscript is a front side or a back side. The present embodiment includes a reading side mode flag to store the currently reading manuscript in a front side or a back side. Before the first reading operation, an odd number mode (a front side reading mode) is set to the reading side mode flag.

Figure 5A:
FIG. 5 is an example of a display image that is displayed on the liquid crystal display of the operation display.
Figure 5B:
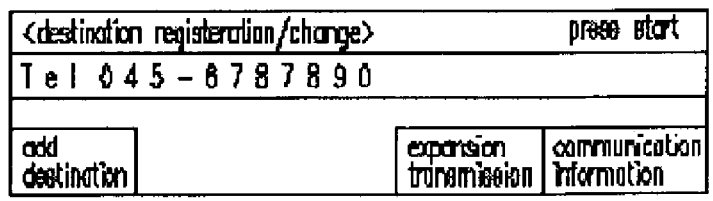
Figure 5C:
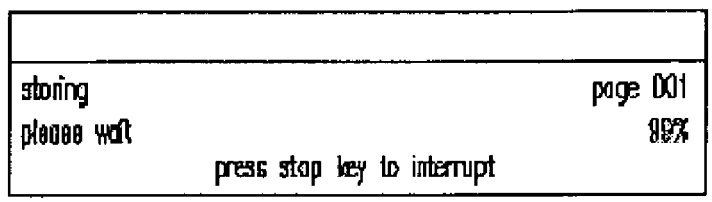

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way is stored in a prescribed location of a work area according to a value of the reading side mode flag and an order-of reading pages at this time (Step 101). In addition, during executing Step 101, a guidance message, e.g., shown in FIG. 5C, is displayed on the liquid crystal display 7j to inform a user with a message that the manuscript reading process being processed.

As one page of the manuscript set has been read, the process checks as to whether a next page is put on the manuscript input tray (Step 102). When a determination result of Step 102 is "YES", the process returns to Step 101 to read the other manuscripts. When there is no manuscript to be read on the manuscript input tray, i.e., the determination result of Step 102 is "NO", the front sides of one manuscript or the reading operation comes to an end. At this time, the process checks as to whether the successive manuscript reading mode is set (Step 103).

Figure 5D:
Figure 5E:
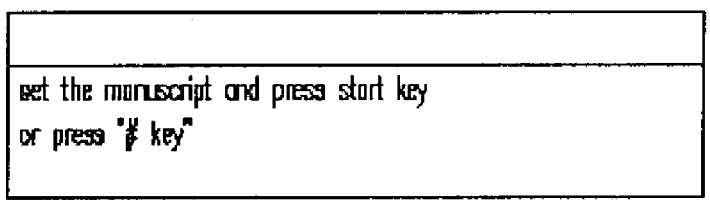
Figure 5F:
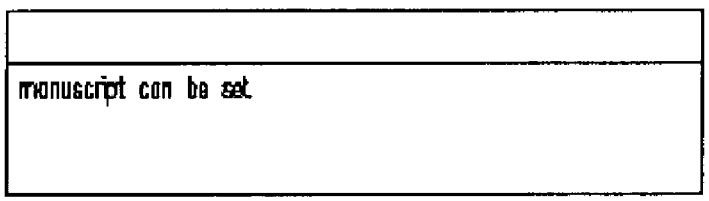

When a determination result of Step 103 is "YES", a timer for counting a prescribed time, e.g., 30 seconds, is set (started) at Step 104, and a guidance message that the manuscript can be set as shown in FIG. 5F is displayed (Step 105). Under this condition, the process checks as to whether the next manuscript set is set on the manuscript input tray until the timer set (started) at Step 104 reaches a time out (a NO loop of Steps 106 and 107).

When the next manuscript set is set on the manuscript input tray until the timer set (started) at Step 104 reaches a time out, and a determination result of Step 106 is "YES", the process returns to Step 101 to performing a manuscript reading process for the next manuscript set. In addition, when the next manuscript set is not set on the manuscript input tray until the timer set (started) at Step 104 reaches a time out, and when a determination result of Step 107 is "YES", the process moves to the back side reading operation. Namely, whether the double-sided manuscript reading mode is set is first checked. When a determination result of Step 108 is "YES", the process checks whether a value of the odd number mode is set to the currently reading side mode flag (Step 109). When the odd number mode is set to the currently reading side mode flag, i.e., a determination result of Step 109 is "YES", the double-sided manuscript reading mode is set and the front side reading operation is finished.

Therefore, a value of an even number mode is set to the currently reading side mode flag (Step 110), and the timer for counting a prescribed time, e.g., 30 seconds, is set (started) at Step 111. Then, guidance on instructing to set the back sides as shown in FIG. 6B is displayed. Under this condition, the process checks as to whether the back sides of the manuscript set are set on the manuscript input tray until the timer set (started) at Step 111 reaches a time out (a NO loop of Steps 113 and 114)

When the back sides of the manuscript set are set on the manuscript input tray until the timer set (started) at Step 111 reaches the time out and a determination result of Step 113 is "YES, the process returns to Step 101 to perform the manuscript reading process for the back sides of the next manuscript set. In addition, when the back sides of the manuscript set are set on the manuscript input tray until the timer set (started) at Step 111 reaches the time out and a determination result of Step 114 is "YES, a value of the odd number mode is set to the reading side mode flag (Step 115) and then the manuscript reading process is finished.

When the successive manuscript reading mode is not set and a determination result of Step 103 is "NO", the process proceeds to Step 108 to perform the subsequent Steps. When a determination result of Step 108 is "NO" and a determination result of Step 109 is "NO", the process proceeds to Step 115 to set the odd number mode value to the reading side mode flag, and then finishes the manuscript reading process.

Regarding the guidance message, for example, during executing the NO loop of Steps 106, 107 and executing the NO loop of Steps 113, 114, a guidance message to display that the manuscript is being stored as shown in FIG. 5C can be added, in order to inform the user clearly of a message that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operation process can become smooth. Differences between the manuscript sets and differences distinguishing the front side from back side, etc., can be tremendously reduced. Therefore, the reading operation becomes very convenient.

Figure 8:
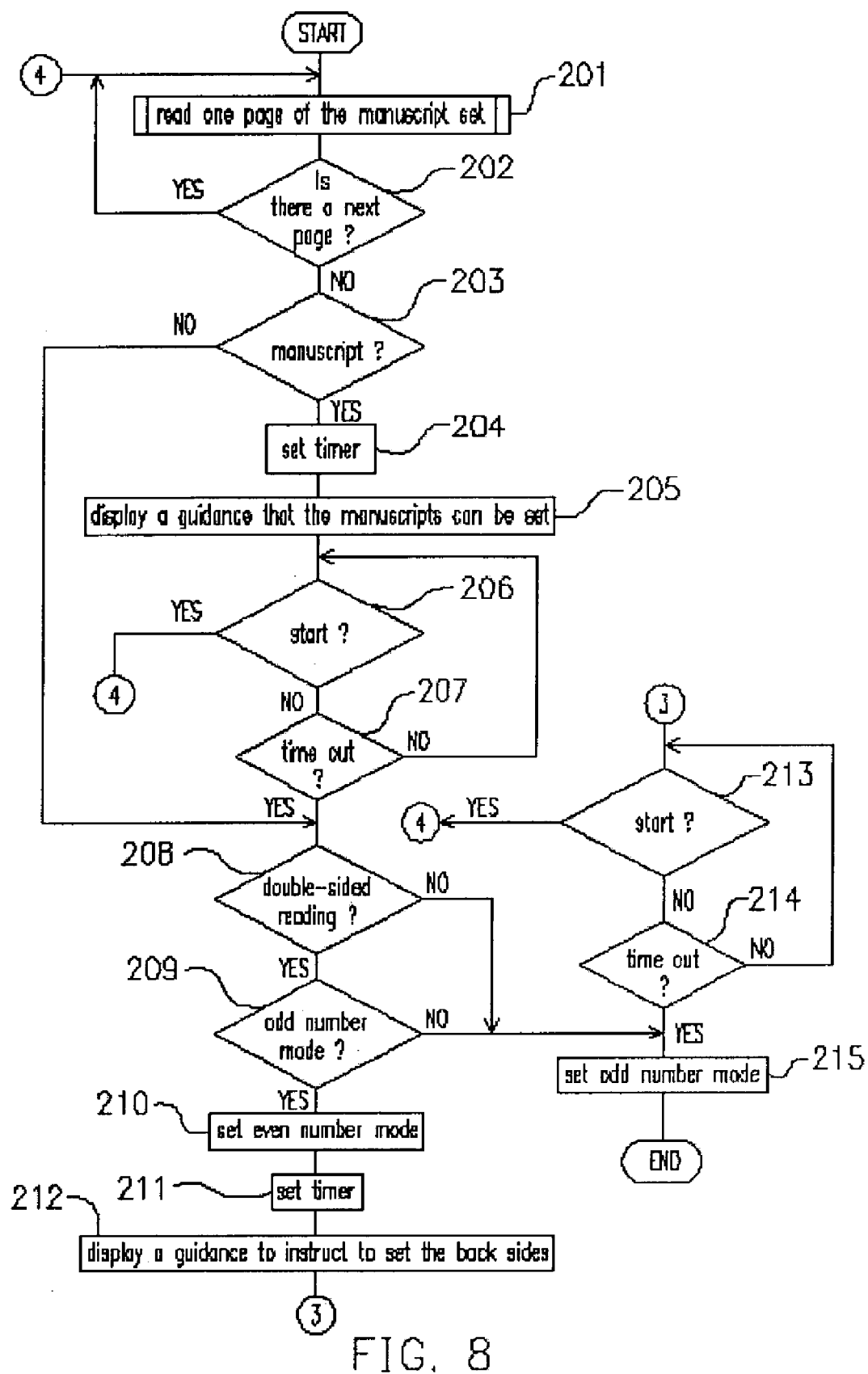
FIG. 8 shows an example of another manuscript reading process.

FIG. 8 shows an example of another manuscript reading process. Because the embodiment has double-sided manuscript reading mode, it is necessary to be able to recognize whether the currently reading manuscript is a front side or a back side. The present embodiment includes a reading side mode flag to store the currently reading manuscript as a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 201). In addition, during executing Step 201, a guidance message, e.g., shown in FIG. 5C, is displayed on the liquid crystal display 7j to inform a user with a message that the manuscript reading process is ongoing.

As one page of the manuscript set has been read, the process checks as to whether a next page is put on the manuscript input tray (Step 202). When a determination result of Step 202 is "YES", the process returns to Step 201 to read the other manuscripts. When there is no manuscript to be read on the manuscript input tray, i.e., the determination result of Step 202 is "NO", the front sides of one manuscript or the reading operation comes to an end. At this time, the process checks as to whether the successive manuscript reading mode is set (Step 203).

When a determination result of Step 203 is "YES", a timer for counting a prescribed time, e.g., 30 seconds, is set (started) at Step 204, and a guidance message that the manuscript can be set as shown in FIG. 5D is displayed (Step 205). Under this condition, the process checks as to whether the start key 7a is pressed until the timer set (started) at Step 204 reaches a time out (a NO loop of Steps 206 and 207).

When the start key 7a is pressed until the timer set (started) at Step 204 reaches a time out, and a determination result of Step 206 is "YES", the process returns to Step 201 to performing a manuscript reading process for the next manuscript set. In addition, when the start key 7a is not pressed until the timer set (started) at Step 204 reaches a time out, and when a determination result of Step 207 is "YES", the process moves to the back side reading operation; namely, whether the double-sided manuscript reading mode is set is first checked (Step 208). When a determination result of Step 208 is "YES", the process checks whether a value of the odd number mode is set to the currently reading side mode flag (Step 209). When the odd number mode is set to the currently reading side mode flag, i.e., a determination result of Step 209 is "YES", the double-sided manuscript reading mode is set and the front side reading operation is finished.

Therefore, a value of an even number mode is set to the currently reading side mode flag (Step 210), and the timer for counting a prescribed time, e.g., 30 seconds, is set (started) at Step 211. Then, a guidance to instruct to set the back sides as shown in FIG. 6C is displayed (Step 212). Under this condition, the process checks as to whether the start key 7a is pressed until the timer set (started) at Step 211 reaches a time out (a NO loop of Steps 213 and 214).

When the start key 7a is pressed until the timer set (started) at Step 211 reaches the time out and a determination result of Step 213 is "YES, the process returns to Step 201 to perform the manuscript reading process for the back sides of the next manuscript set. In addition, When the start key 7a is not pressed until the timer set (started) at Step 211 reaches the time out and a determination result of Step 214 is "YES, a value of the odd number mode is set to the reading side mode flag (Step 215) and then the manuscript reading process is finished.

When the successive manuscript reading mode is not set and a determination result of Step 203 is "NO", the process proceeds to Step 208 to perform the subsequent Steps. When a determination result of Step 208 is "NO" and a determination result of Step 209 is "NO", the process proceeds to Step 215 to set the odd number mode value to the reading side mode flag, and then finishes the manuscript reading process.

Regarding the guidance message, for example, during executing the NO loop of Steps 206, 207 and executing the NO loop of Steps 213, 214, a guidance message to display that the manuscript is being stored as shown in FIG. 5C can be added, in order to inform the user clearly of a message that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be aware of a continuous condition of the reading operation, which is very effective.

Figure 9:
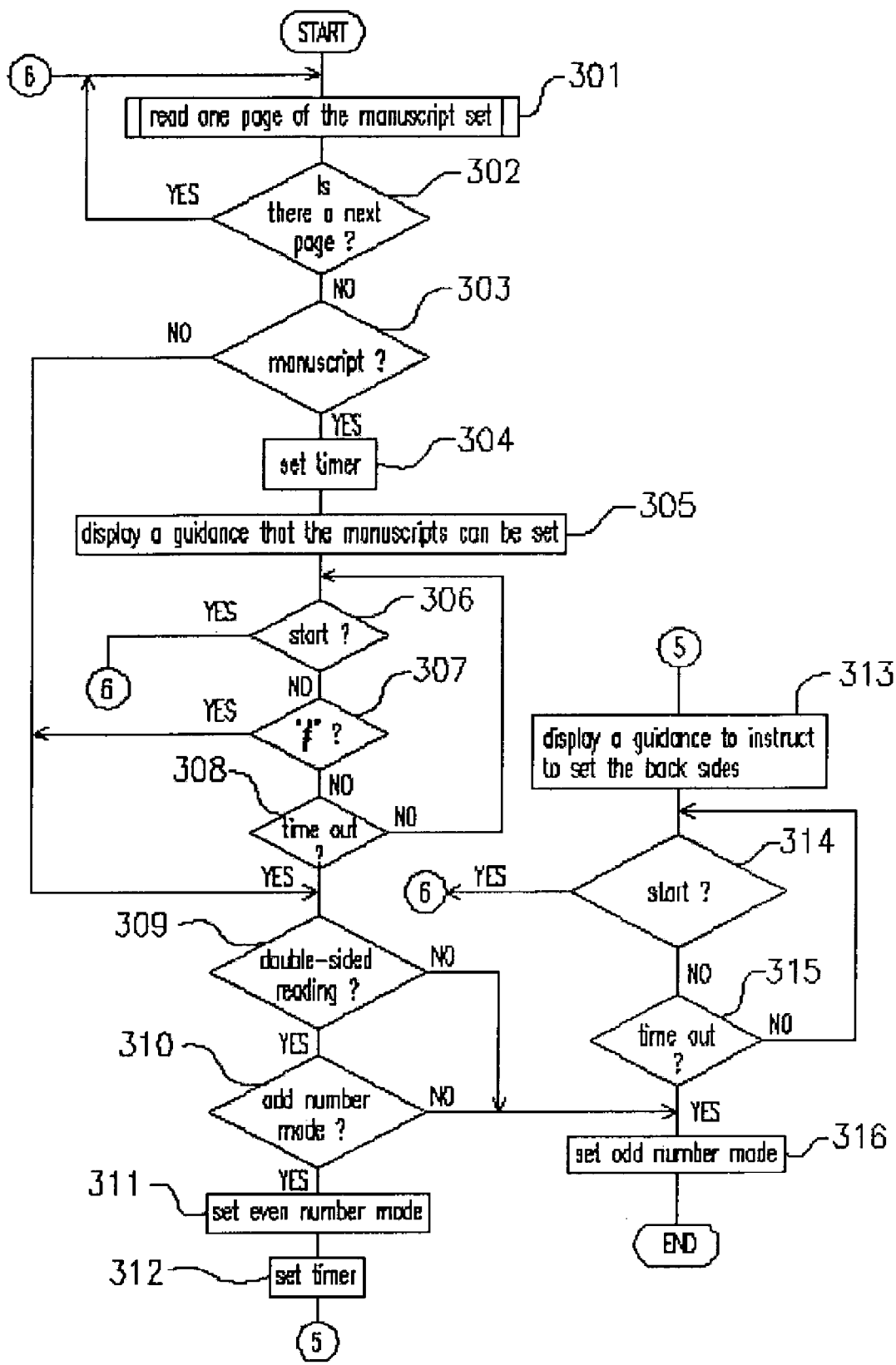
FIG. 9 shows an example of another manuscript reading process.

FIG. 9 shows an example of another manuscript reading process. Because the embodiment has double-sided manuscript reading mode, it is necessary to be able to recognize that the currently reading manuscript is a front side or a back side. The present embodiment includes a reading side mode flag to determine whether the currently reading manuscript is a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 301). In addition, during executing Step 301, a guidance message, e.g., shown in FIG. 5C, is displayed on the liquid crystal display 7j to inform a user with a message that the manuscript reading process is ongoing.

As one page of the manuscript set has been read, the process checks as to whether a next page is put on the manuscript input tray (Step 302). When a determination result of Step 302 is "YES", the process returns to Step 301 to read the other manuscripts. When there is no manuscript to be read on the manuscript input tray, i.e., the determination result of Step 302 is "NO", the front sides of one manuscript or the reading operation comes to an end. At this time, the process checks as to whether the successive manuscript reading mode is set (Step 303).

When a determination result of Step 303 is "YES", a timer for counting a prescribed time, e.g., 30 seconds, is set (started) at Step 304, and a guidance message that the manuscript can be set as shown in FIG. 5E is displayed (Step 305). Under this condition, the process checks as to whether the start key 7a is pressed or checks as to whether the "#" key for acknowledging a message of no additional manuscripts until the timer set (started) at Step 304 reaches a time out (a NO loop of Steps 306, 307 and 308).

When the start key 7a is pressed until the timer set (started) at Step 304 reaches a time out, and a determination result of Step 306 is "YES", the process returns to Step 301 to performing a manuscript reading process for the next manuscript set. In addition, when the "#" key is pressed until the timer set (started) at Step 304 reaches a time out and a determination result of Step 307 is "YES", and when the start key 7a is not pressed until the timer set (started) at Step 304 reaches a time out, the process moves to the back side reading operation if a determination result of Step 308 is "YES". Namely, whether the double-sided manuscript reading mode is set is first checked (Step 309). When a determination result of Step 309 is "YES", the process checks whether a value of the odd number mode is set to the currently reading side mode flag (Step 310). When the odd number mode is set to the currently reading side mode flag, i.e., a determination result of Step 310 is "YES", the double-sided manuscript reading mode is set and the front side reading operation is finished.

Therefore, a value of an even number mode is set to the currently reading side mode flag (Step 311), and the timer for counting a prescribed time, e.g., 30 seconds, is set (started) at Step 312. Then, a guidance to instruct to set the back sides as shown in FIG. 6C is displayed (Step 313). Under this condition, the process checks as to whether the start key 7a is pressed until the timer set (started) at Step 312 reaches a time out (a NO loop of Steps 314 and 315).

When the start key 7a is pressed until the timer set (started) at Step 312 reaches the time out and a determination result of Step 314 is "YES, the process returns to Step 301 to perform the manuscript reading process for the back sides of the next manuscript set. In addition, When the start key 7a is not pressed until the timer set (started) at Step 312 reaches the time out and a determination result of Step 315 is "YES, a value of the odd number mode is set to the reading side mode flag (Step 316) and then the manuscript reading process is finished.

When the successive manuscript reading mode is not set and a determination result of Step 303 is "NO", the process proceeds to Step 309 to perform the subsequent Steps. When a determination result of Step 309 is "NO" and a determination result of Step 310 is "NO", the process proceeds to Step 316 to set the odd number mode value to the reading side mode flag, and then finishes the manuscript reading process.

Regarding the guidance message, for example, during executing the NO loop of Steps 306, 307 and 308 and executing the NO loop of Steps 314, 315, a guidance message indicating that the manuscript is being stored as shown in FIG. 5C can be added, in order to inform clearly the user with a message that image data are being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be made aware of an ongoing reading operation; and this, is very effective. Furthermore, when the reading operation of the manuscript set is finished, the process can proceed to the double-sided manuscript reading mode by pressing the "#" key. Therefore, the time required to read the manuscript set can be reduced.

Figure 10:
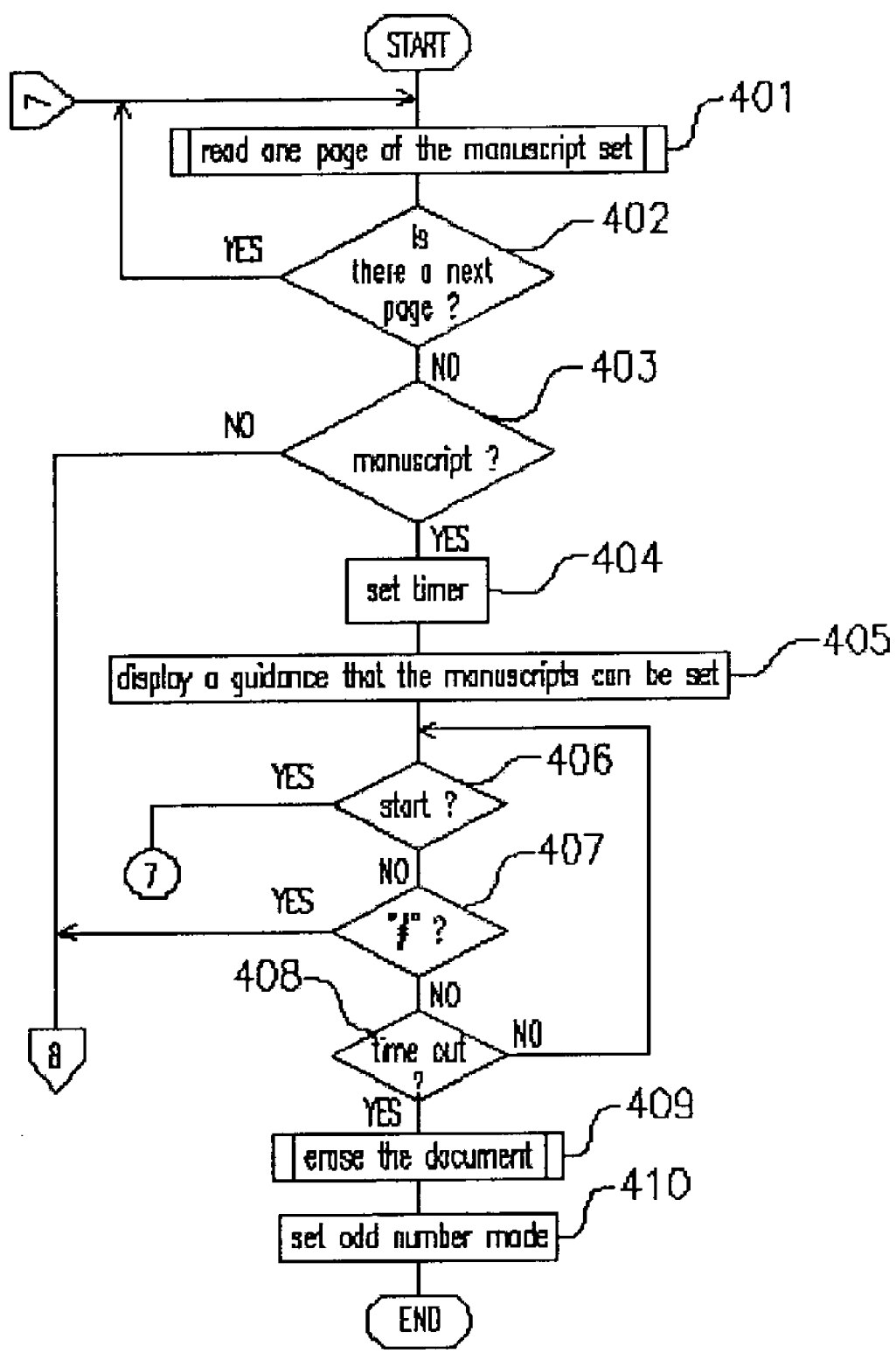
FIGS. 10 and 11 show an example of another manuscript reading process.
Figure 11:
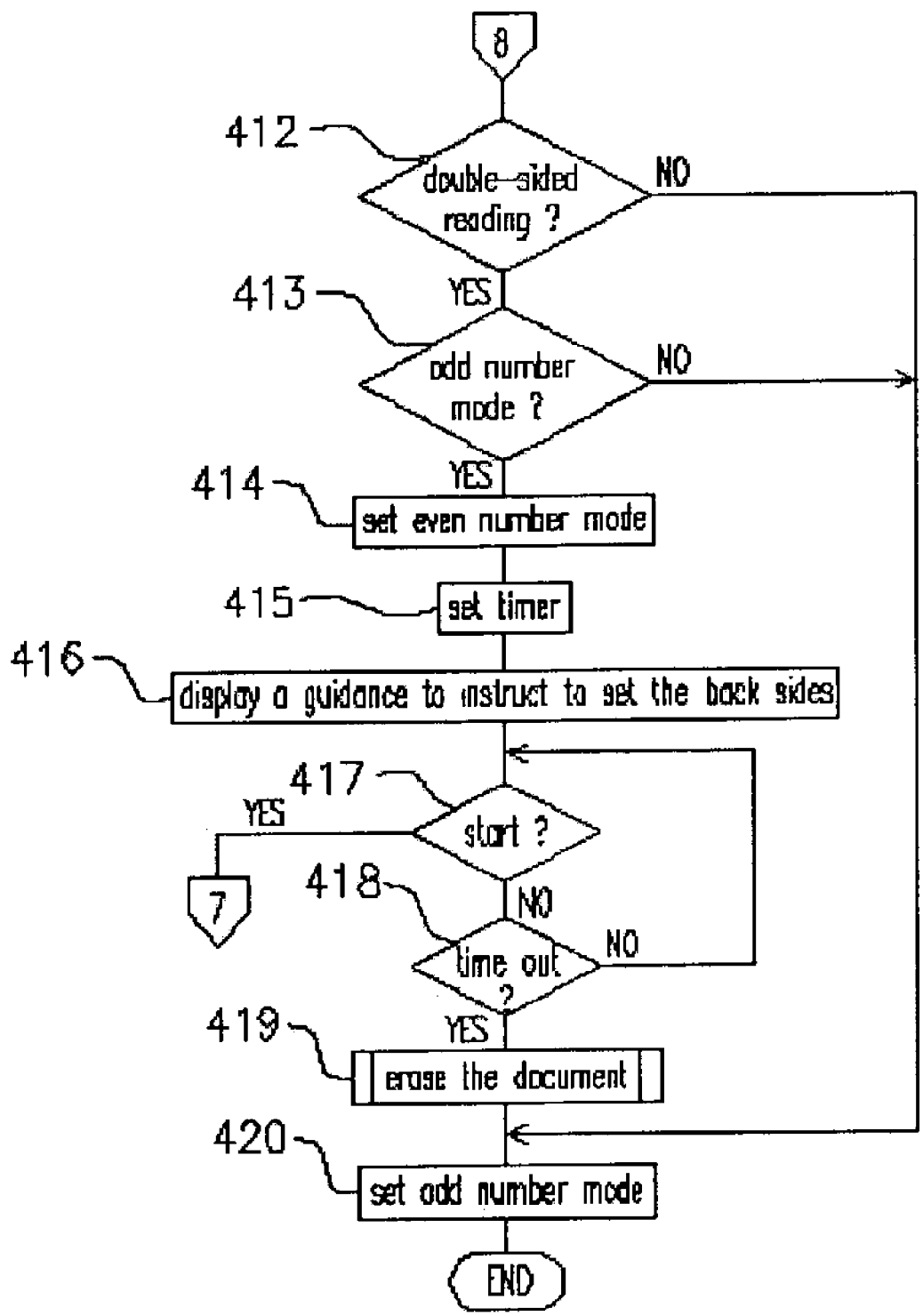

FIGS. 10 and 11 show an example of another manuscript reading process. Because the embodiment has double-sided manuscript reading mode, it is necessary to be able to recognize that the currently reading manuscript is a front side or a back side. The present embodiment includes a reading side mode flag to determine whether the currently reading manuscript is a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 401). In addition, during executing Step 401, a guidance message, e.g., shown in FIG. 5C, is displayed on the liquid crystal display 7j to inform a user of a message of the manuscript reading process being processed.

As one page of the manuscript set has been read, the process checks as to whether a next page is put on the manuscript input tray (Step 402). When a determination result of Step 402 is "YES", the process returns to Step 401 to read the other manuscripts. When there is no manuscript to be read on the manuscript input tray, i.e., the determination result of Step 402 is "NO", the front sides of one manuscript or the reading operation comes to an end. At this time, the process checks as to whether the successive manuscript reading mode is set (Step 403).

When a determination result of Step 403 is "YES", a timer for counting a prescribed time, e.g., 30 seconds, is set (started) at Step 404, and a guidance message that the manuscript can be set as shown in FIG. 5E is displayed (Step 405). Under this condition, the process checks as to whether the start key 7a is pressed or checks as to whether the "#" key for acknowledging a message of no additional manuscripts until the timer set (started) at Step 404 reaches a time out (a NO loop of Steps 406, 407 and 408).

When the start key 7a is pressed until the timer set (started) at Step 304 reaches a time out, and a determination result of Step 306 is "YES", the process returns to Step 301 to performing a manuscript reading process for the next manuscript set.

In addition, when the start key 7a or the "#" key is not pressed until the timer set (started) at Step 404 reaches a time out and when a determination result of Step 408 is "YES", a proper manuscript set operation is not performed. Therefore, the image data file (document) stored at this time is erased (Step 409). Then, an odd number mode value is set to the reading side mode flag (Step 410) to end the reading operation at this time (error end). On the other hand, when the "#" key is pressed until the timer set (started) at Step 404 reaches a time out and, the process moves to the back side reading operation if a determination result of Step 407 is "YES". Namely, whether the double-sided manuscript reading mode is set is first checked (Step 412). When a determination result of Step 412 is "YES", the process checks whether a value of the odd number mode is set to the currently reading side mode flag (Step 413). When the odd number mode is set to the currently reading side mode flag, i.e., a determination result of Step 413 is "YES", the double-sided manuscript reading mode is set and the front side reading operation is finished.

Therefore, a value of an even number mode is set to the currently reading side mode flag (Step 414), and the timer for counting a prescribed time, e.g., 30 seconds, is set (started) at Step 415. Then, a guidance to instruct to set the back sides as shown in FIG. 6C is displayed (Step 416). Under this condition, the process checks as to whether the start key 7a is pressed until the timer set (started) at Step 415 reaches a time out (a NO loop of Steps 417 and 418).

When the start key 7a is pressed until the timer set (started) at Step 415 reaches the time out and a determination result of Step 417 is "YES, the process returns to Step 401 to perform the manuscript reading process for the back sides of the next manuscript set. In addition, when the start key 7a is not pressed until the timer set (started) at Step 415 reaches the time out and a determination result of Step 418 is "YES, the image data file (document) stored at this time is erased (Step 419) because a proper manuscript set operation is not performed. Then, an odd number mode value is set to the reading side mode flag (Step 410), and then the manuscript reading process is finished.

When the successive manuscript reading mode is not set and a determination result of Step 403 is "NO", the process proceeds to Step 412 to perform the subsequent Steps. When a determination result of Step 412 is "NO" and a determination result of Step 413 is "NO", the process proceeds to Step 420 to set the odd number mode value to the reading side mode flag, and then finishes the manuscript reading process.

Regarding the guidance message, for example, during executing the NO loop of Steps 406, 407 and 408 and executing the NO loop of Steps 417, 418, a guidance message to display that the manuscript is being stored as shown in FIG. 5C can be added, in order to inform clearly the user that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive operational process when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be made aware of an ongoing reading operation; and this is very effective.

Furthermore, when the reading operation of the manuscript set is finished, the process can proceed to the double-sided manuscript reading mode by pressing the "#" key. Therefore, the time required to read the manuscript set can be reduced.

When an operation to put the manuscript set onto the manuscript input tray is interrupted, an image data file (a document file) made of read data till now is erased. Therefore, when the user makes an operation to mistake an order of the manuscript set during the manuscript reading operation, the user is not necessary to make an operation to erase the document file during the mistook reading operation, so that it is very convenient.

Figure 12:
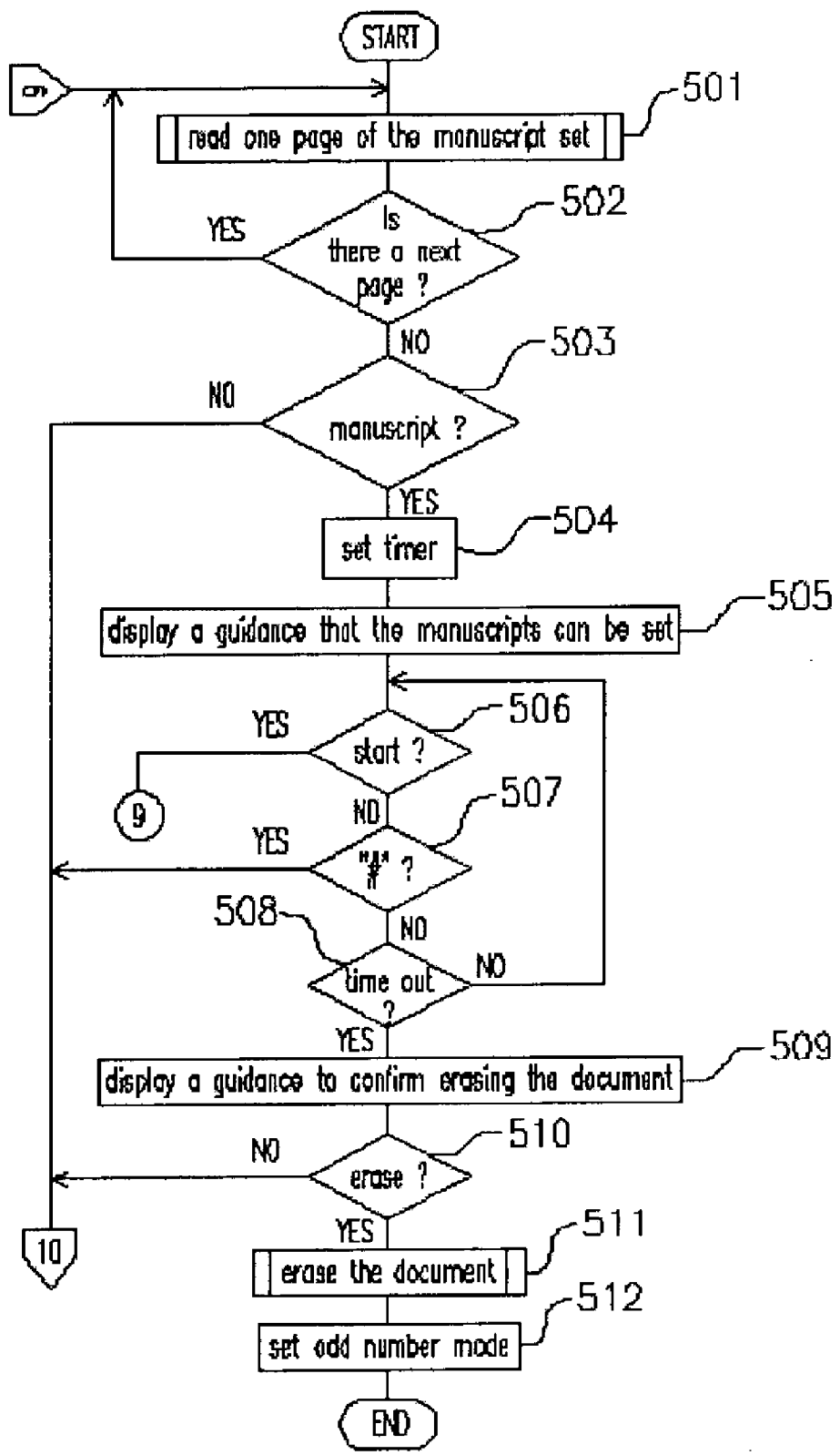
FIGS. 12 and 13 show an example of another manuscript reading process.
Figure 13:
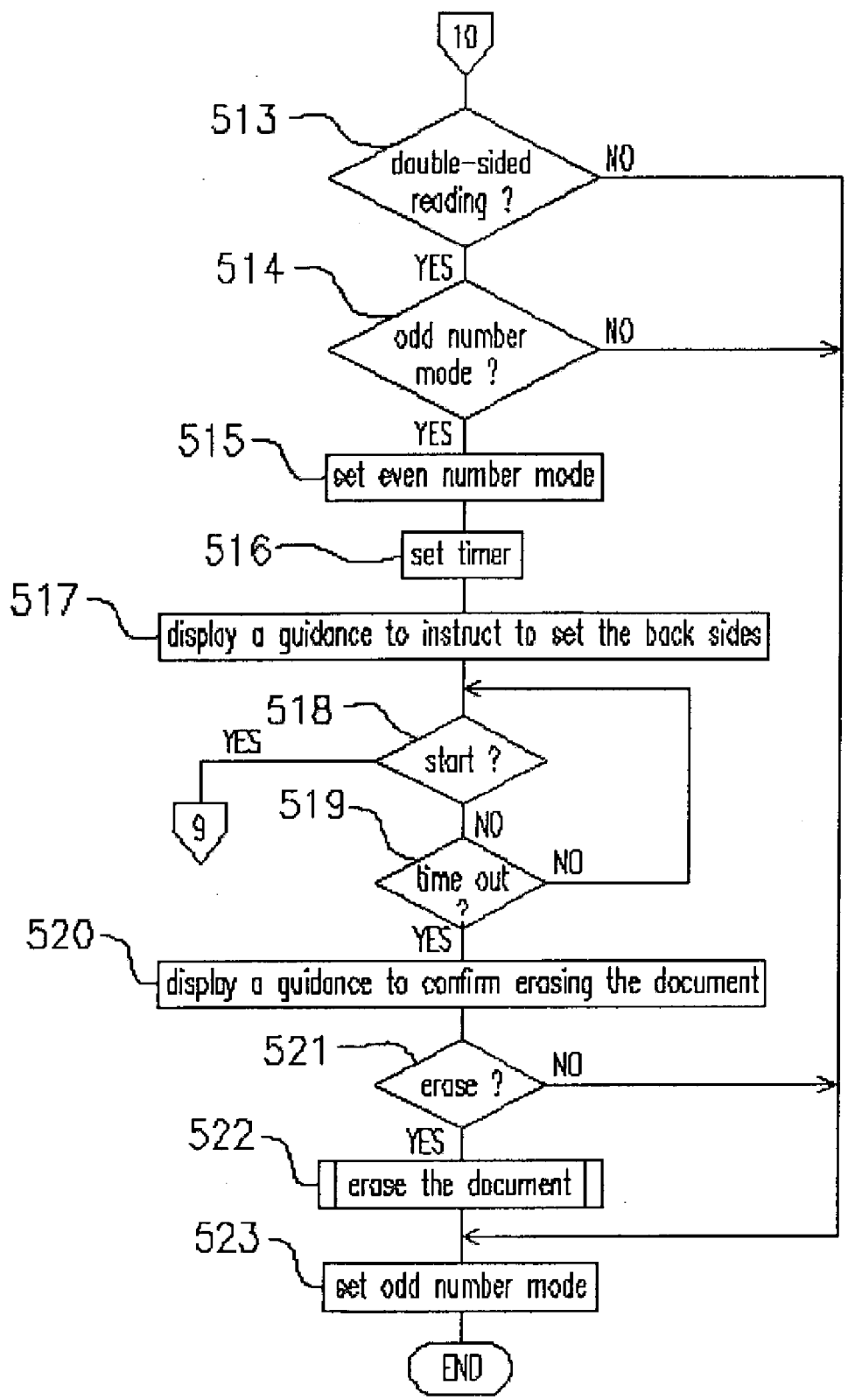

FIGS. 12 and 13 show an example of another manuscript reading process. Because the embodiment has double-sided manuscript reading mode, it is necessary to be able to recognize that the currently reading manuscript is a front side or a back side. The present embodiment includes a reading side mode flag to determine whether the currently reading manuscript is a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 501). In addition, during executing Step 501, a guidance message, e.g., shown in FIG. 5C, is displayed on the liquid crystal display 7j to inform a user of a message of the manuscript reading process being processed.

As one page of the manuscript set has been read, the process checks as to whether a next page is put on the manuscript input tray (Step 502). When a determination result of Step 502 is "YES", the process returns to Step 501 to read the other manuscripts. When there is no manuscript to be read on the manuscript input tray, i.e., the determination result of Step 502 is "NO", the front sides of one manuscript or the reading operation comes to an end. At this time, the process checks as to whether the successive manuscript reading mode is set (Step 503).

When a determination result of Step 503 is "YES", a timer for counting a prescribed time, e.g., 30 seconds, is set (started) at Step 504, and a guidance message that the manuscript can be set as shown in FIG. 5E is displayed (Step 405). Under this condition, the process checks as to whether the start key 7a is pressed or checks as to whether the "#" key for acknowledging a message of no additional manuscripts until the timer set (started) at Step 504 reaches a time out (a NO loop of Steps 506, 507 and 508).

When the start key 7a is pressed until the timer set (started) at Step 504 reaches a time out, and a determination result of Step 506 is "YES", the process returns to Step 501 to performing a manuscript reading process for the next manuscript set.

In addition, when the start key 7a or the "#" key is not pressed until the timer set (started) at Step 504 reaches a time out and a determination result of Step S508 is "YES", a proper manuscript set operation is not performed. In this situation, a guidance message for asking as to whether the document file is erased as shown in FIG. 6A is displayed (Step 509) to confirm whether the user wants to erase the document file (Step 510). When the user wants to erase the document file and when a determination result of Step 510 is "YES", the image data file (document) stored at this time is erased (Step 511). Then, an odd number mode value is set to the reading side mode flag (Step 512) to end the reading operation at this time (error end).

On the other hand, when the "#" key is pressed until the timer set (started) at Step 504 reaches a time out, a determination result of Step 507 is "YES", the user does not want to erase the document file in response to the guidance message displayed at Step 509, and when a determination result of Step 510 is "NO", the process moves to the back side reading operation. Namely, whether the double-sided manuscript reading mode is set is first checked (Step 513). When a determination result of Step 513 is "YES", the process checks whether a value of the odd number mode is set to the currently reading side mode flag (Step 514). When the odd number mode is set to the currently reading side mode flag, i.e., a determination result of Step 413 is "YES", the double-sided manuscript reading mode is set and the front side reading operation is finished.

Therefore, a value of an even number mode is set to the currently reading side mode flag (Step 515), and the timer for counting a prescribed time, e.g., 30 seconds, is set (started) at Step 516. Then, a guidance to instruct to set the back sides as shown in FIG. 6C is displayed (Step 517). Under this condition, the process checks as to whether the start key 7a is pressed until the timer set (started) at Step 516 reaches a time out (a NO loop of Steps 518 and 519).

When the start key 7a is pressed until the timer set (started) at Step 516 reaches the time out and a determination result of Step 518 is "YES, the process returns to Step 501 to perform the manuscript reading process for the back sides of the next manuscript set. In addition, when the start key 7a is not pressed until the timer set (started) at Step 516 reaches the time out and a determination result of Step 519 is "YES, a proper manuscript set operation is not performed. In this situation, a guidance message for asking as to whether the document file is erased as shown in FIG. 6A is displayed (Step 520) to confirm whether the user wants to erase the document file (Step 521). When the user wants to erase the document file and when a determination result of Step 510 is "YES", the image data file (document file) stored at this time is erased (Step 522). Then, an odd number mode value is set to the reading side mode flag (Step 523) to end the reading operation at this time.

On the other hand, when the user does not want to erase the document file in response to the guidance message displayed at Step 520, and when a determination result of Step 521 is "NO", the process moves to Step 523. Then, an odd number mode value is set to the reading side mode flag to finish the reading operation at this time.

When the successive manuscript reading mode is not set and a determination result of Step 503 is "NO", the process proceeds to Step 513 to perform the subsequent Steps. When a determination result of Step 513 is "NO" and a determination result of Step 514 is "NO", the process proceeds to Step 523 to set the odd number mode value to the reading side mode flag, and then finishes the manuscript reading process.

Regarding the guidance message, for example, during executing the NO loop of Steps 506, 507 and 508 and executing the NO loop of Steps 518, 519, a guidance message indicating that the manuscript is being stored as shown in FIG. 5C can be added, in order to inform clearly the user that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can made aware of an ongoing reading operation; and this is very effective.

Furthermore, when the reading operation of the manuscript set is finished, the process can proceed to the double-sided manuscript reading mode by pressing the "#" key. Therefore, the time required to read the manuscript set can be reduced.

When an operation to put the manuscript set onto the manuscript input tray is interrupted, an image data file (a document file) made of read data till now is erased. Therefore, when the user makes an operation to mistake an order of the manuscript set during the manuscript reading operation, the user is not necessary to make an operation to erase the document file during the mistook reading operation, so that it is very convenient. In addition, because the read document files can be erased halfway, when the user disorders an order of the manuscript set or makes a wrong operation, the user is not necessary to make an operation to erase the document file during the mistook reading operation, so that it is very convenient.

Figure 14:
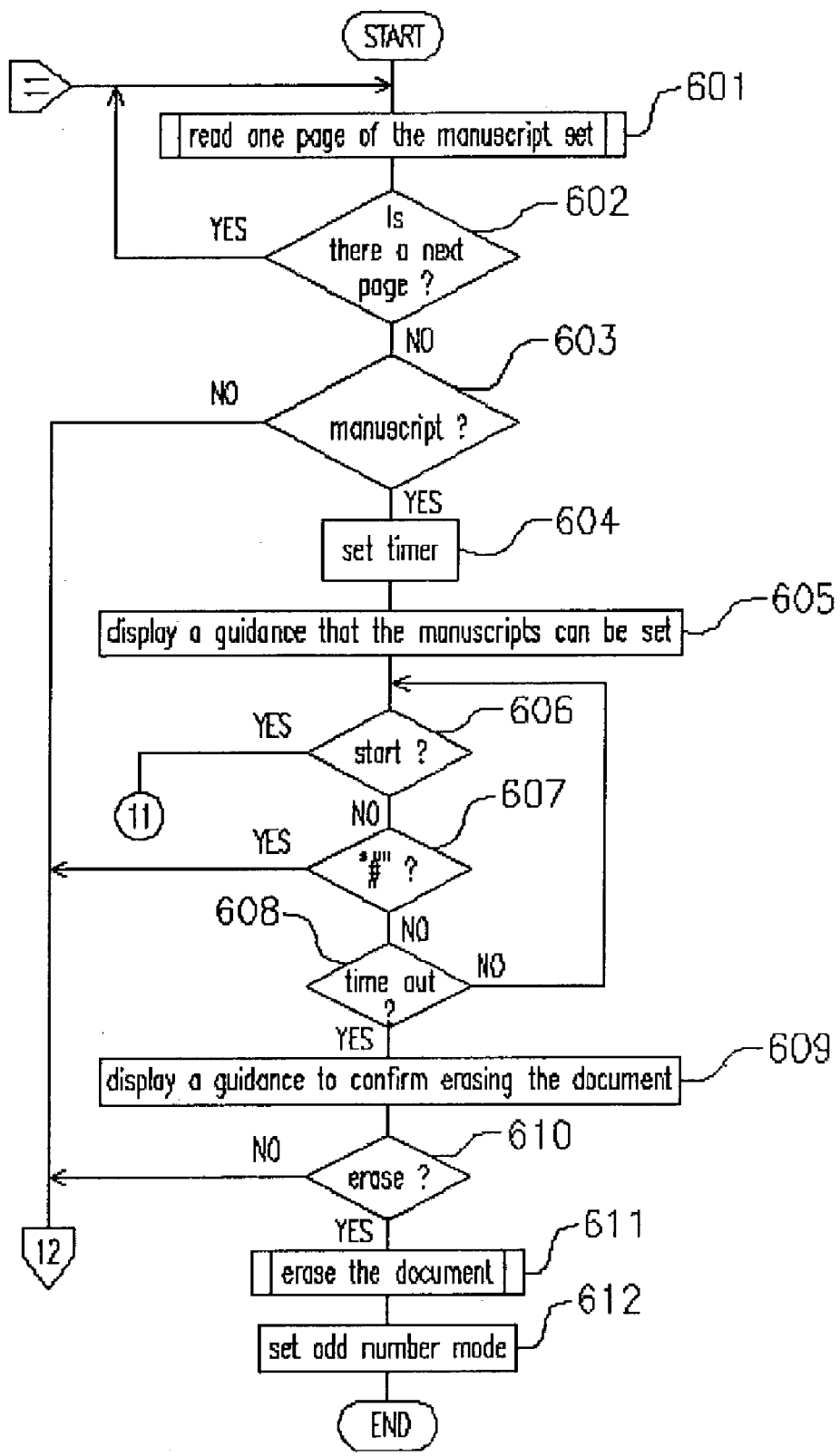
FIGS. 14 and 15 show an example of another manuscript reading process.
Figure 15:
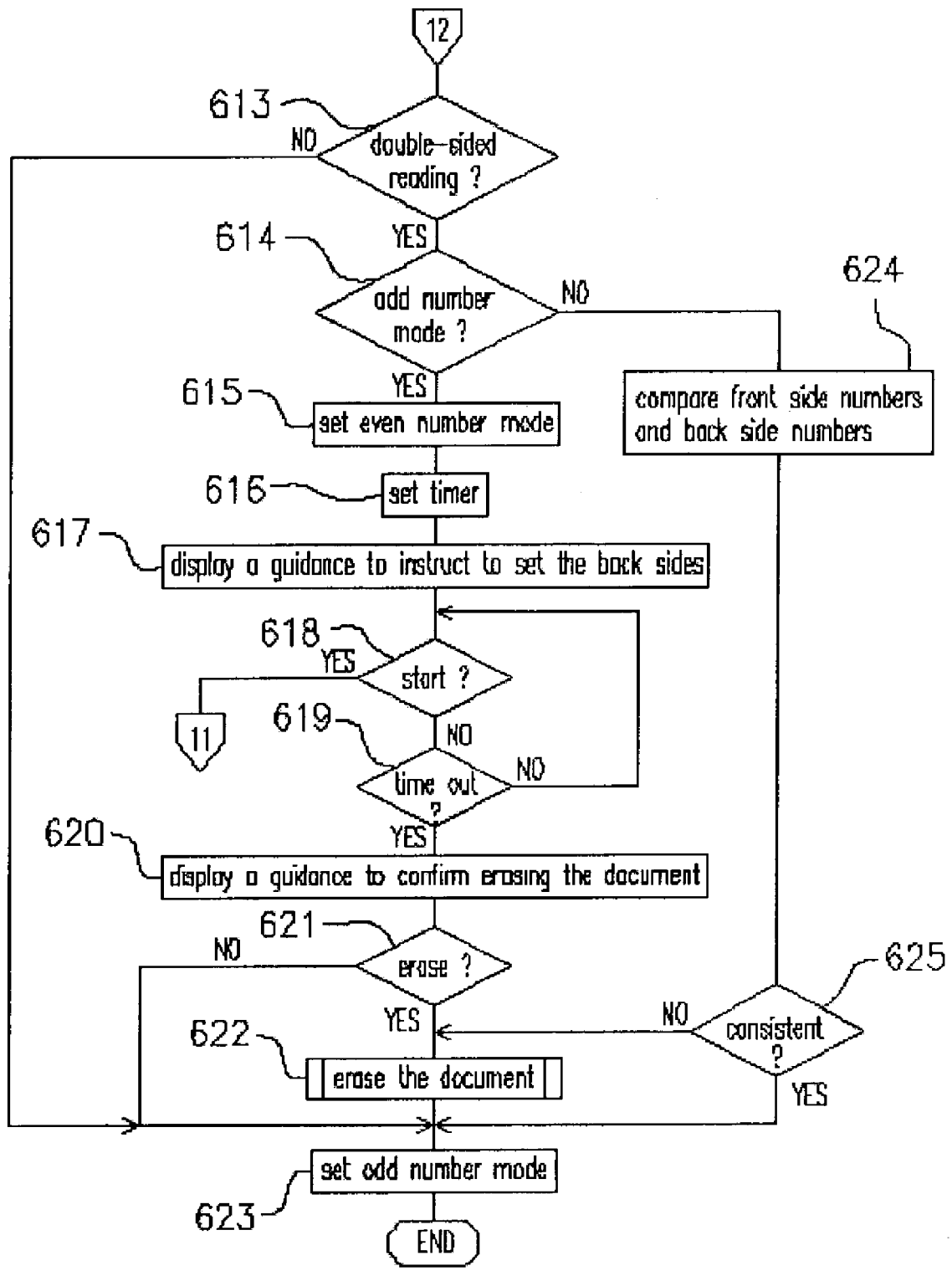

FIGS. 14 and 15 show an example of another manuscript reading process. Because the embodiment has double-sided manuscript reading mode, it is necessary to be able to recognize that the currently reading manuscript is a front side or a back side. The present embodiment includes a reading side mode flag to determine whether the currently reading manuscript is a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way is stored to a prescribed location of a work area according to a value of the reading side mode flag and an order of reading pages at this time (Step 601). In addition, during executing Step 601, a guidance message, e.g., shown in FIG. 5C, is displayed on the liquid crystal display 7j to inform a user of a message of the manuscript reading process being processed.

As one page of the manuscript set has been read, the process checks as to whether a next page is put on the manuscript input tray (Step 602). When a determination result of Step 602 is "YES", the process returns to Step 601 to read the other manuscripts. When there is no manuscript to be read on the manuscript input tray, i.e., the determination result of Step 602 is "NO", the front sides of one manuscript or the reading operation comes to an end. At this time, the process checks as to whether the successive manuscript reading mode is set (Step 603).

When a determination result of Step 603 is "YES", a timer for counting a prescribed time, e.g., 30 seconds, is set (started) at Step 604, and a guidance message that the manuscript can be set as shown in FIG. 5E is displayed (Step 605). Under this condition, the process checks as to whether the start key 7a is pressed or checks as to whether the "#" key for acknowledging a message of no additional manuscripts until the timer set (started) at Step 604 reaches a time out (a NO loop of Steps 606, 607 and 608).

When the start key 7a is pressed until the timer set (started) at Step 604 reaches a time out and a determination result of Step 606 is "YES", the process returns to Step 601 to performing a manuscript reading process for the next manuscript set.

In addition, when the start key 7a or the "#" key is not pressed until the timer set (started) at Step 604 reaches a time out and a determination result of Step 608 is "YES", a proper manuscript set operation is not performed. In this situation, a guidance message for asking as to whether the document file is erased as shown in FIG. 6A is displayed (Step 609) to confirm whether the user wants to erase the document file (Step 610). When the user wants to erase the document file and when a determination result of Step 610 is "YES", the image data file (document) stored at this time is erased (Step 611). Then, an odd number mode value is set to the reading side mode flag (Step 612) to end the reading operation at this time (error end).

On the other hand, when the "#" key is pressed until the timer set (started) at Step 604 reaches a time out, a determination result of Step 607 is "YES", the user does not want to erase the document file in response to the guidance message displayed at Step 609, and when a determination result of Step 610 is "NO", the process moves to the back side reading operation. Namely, whether the double-sided manuscript reading mode is set is first checked (Step 613). When a determination result of Step 613 is "YES", the process checks whether a value of the odd number mode is set to the currently reading side mode flag (Step 614). When the odd number mode is set to the currently reading side mode flag, i.e., a determination result of Step 613 is "YES", the double-sided manuscript reading mode is set and the front side reading operation is finished.

Therefore, a value of an even number mode is set to the currently reading side mode flag (Step 615), and the timer for counting a prescribed time, e.g., 30 seconds, is set (started) at Step 616. Then, a guidance to instruct to set the back sides as shown in FIG. 6C is displayed (Step 617). Under this condition, the process checks as to whether the start key 7a is pressed until the timer set (started) at Step 616 reaches a time out (a NO loop of Steps 618 and 619).

When the start key 7a is pressed until the timer set (started) at Step 616 reaches the time out and a determination result of Step 618 is "YES, the process returns to Step 601 to perform the manuscript reading process for the back sides of the next manuscript set. In addition, when the start key 7a is not pressed until the timer set (started) at Step 616 reaches the time out and a determination result of Step 619 is "YES, a proper manuscript set operation is not performed. In this situation, a guidance message for asking as to whether the document file is erased as shown in FIG. 6A is displayed (Step 620) to confirm whether the user wants to erase the document file (Step 621). When the user wants to erase the document file and when a determination result of Step 621 is "YES", the image data file (document file) stored at this time is erased (Step 622). Then, an odd number mode value is set to the reading side mode flag (Step 623) to end the reading operation at this time.

On the other hand, when the user does not want to erase the document file in response to the guidance message displayed at Step 620, and when a determination result of Step 621 is "NO", the process moves to Step 623. Then, an odd number mode value is set to the reading side mode flag to finish the reading operation at this time.

When the successive manuscript reading mode is not set and a determination result of Step 603 is "NO", the process proceeds to Step 613 to perform the subsequent Steps. When a determination result of Step 613 is "NO", the process proceeds to Step 623 to set the odd number mode value to the reading side mode flag, and then finishes the manuscript reading process.

When a determination result of Step 614 is "NO", the double-sided reading operation for all manuscript sets is finished. Therefore, a number of the front sides and a number of back sides are compared (Step 624) to checks as to whether the numbers of the front sides and the back sides are consistent (Step 625). When a determination result of Step 625 is "YES", because a proper manuscript reading operation is finished, the process proceeds to Step 623 to set an odd number mode value to the reading side mode flag, and then terminates the reading operation.

On the other hand, when a determination result of Step 625 is "NO", it is a situation that the numbers of the front sides and the back sides are not consistent. There is a wrong operation for the manuscript set, and then the process proceeds to Step 622 to erase the image data file (document file) stored at that time. Then, an odd number mode value is set to the reading side mode flag (Step 623), and the reading operation is terminated.

Regarding the guidance message, for example, during executing the NO loop of Steps 606, 607 and 608 and executing the NO loop of Steps 618, 619, a guidance message to display that the manuscript is being stored as shown in FIG. 5C can be added, in order to inform the user clearly of a message that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be made aware of an ongoing reading operation; and this is very effective.

Furthermore, when the reading operation of the manuscript set is finished, the process can proceed to the double-sided manuscript reading mode by pressing the "#" key. Therefore, the time required to read the manuscript set can be reduced.

When an operation to put the manuscript set onto the manuscript input tray is interrupted, an image data file (a document file) made of read data till now is erased. Therefore, when the user makes an operation to mistake an order of the manuscript set during the manuscript reading operation, the user is not necessary to make an operation to erase the document file during the mistook reading operation, so that it is very convenient. In addition, because the read document files can be erased halfway, when the user disorders an order of the manuscript set or makes a wrong operation, it is not necessary that the user make an operation to erase the document file during the mistaken reading operation; so that it is very convenient.

In addition, when the numbers of the front sides and the back sides are not consistent, it is a situation in which the user makes a wrong operation for the manuscript set. In this situation, because the read document file is erased, it is not necessary for the user to erase the document file when a wrong operation is made; so that it is very convenient.

Figure 16:
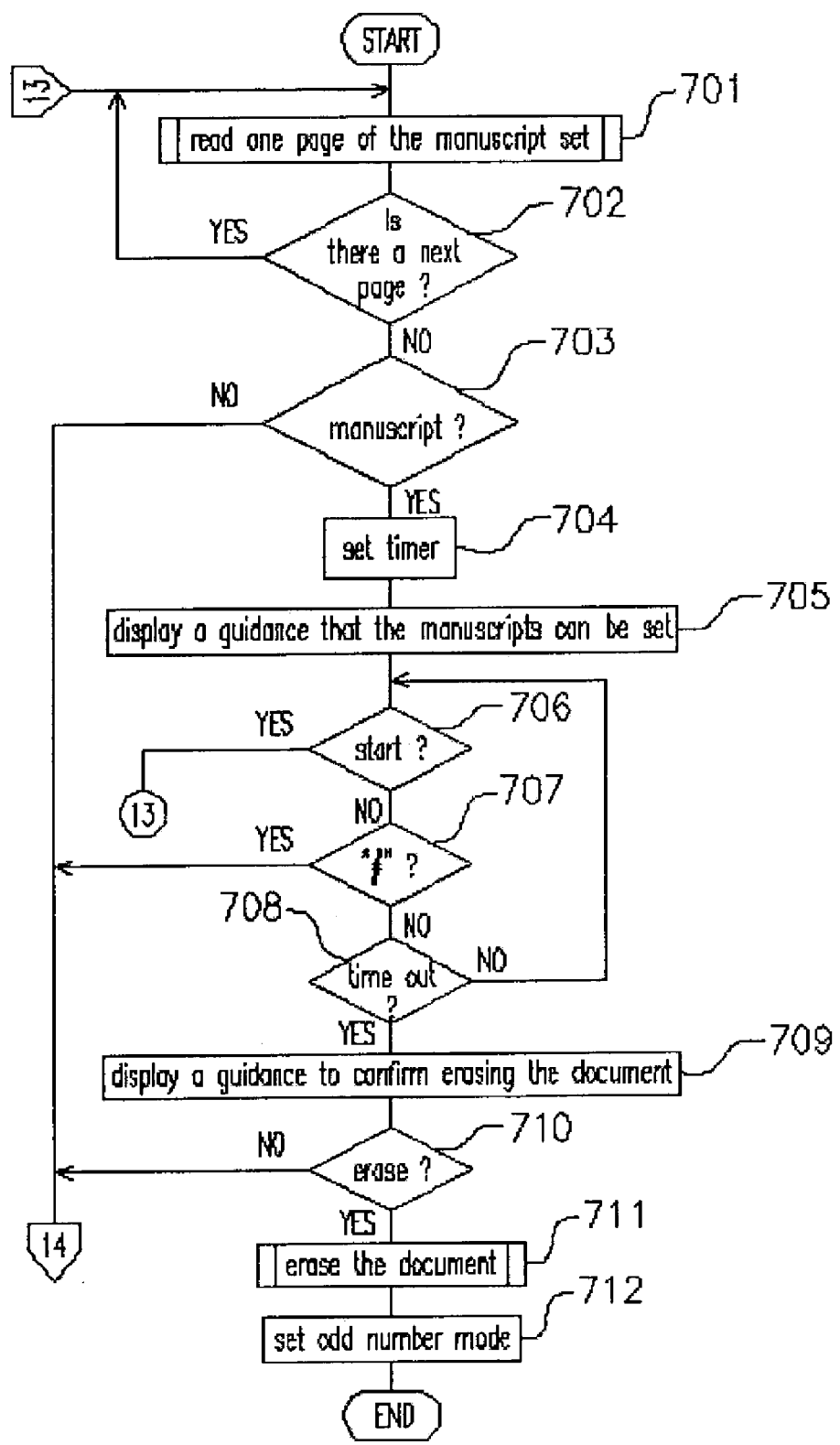
FIGS. 16 and 17 show an example of another manuscript reading process.
Figure 17:
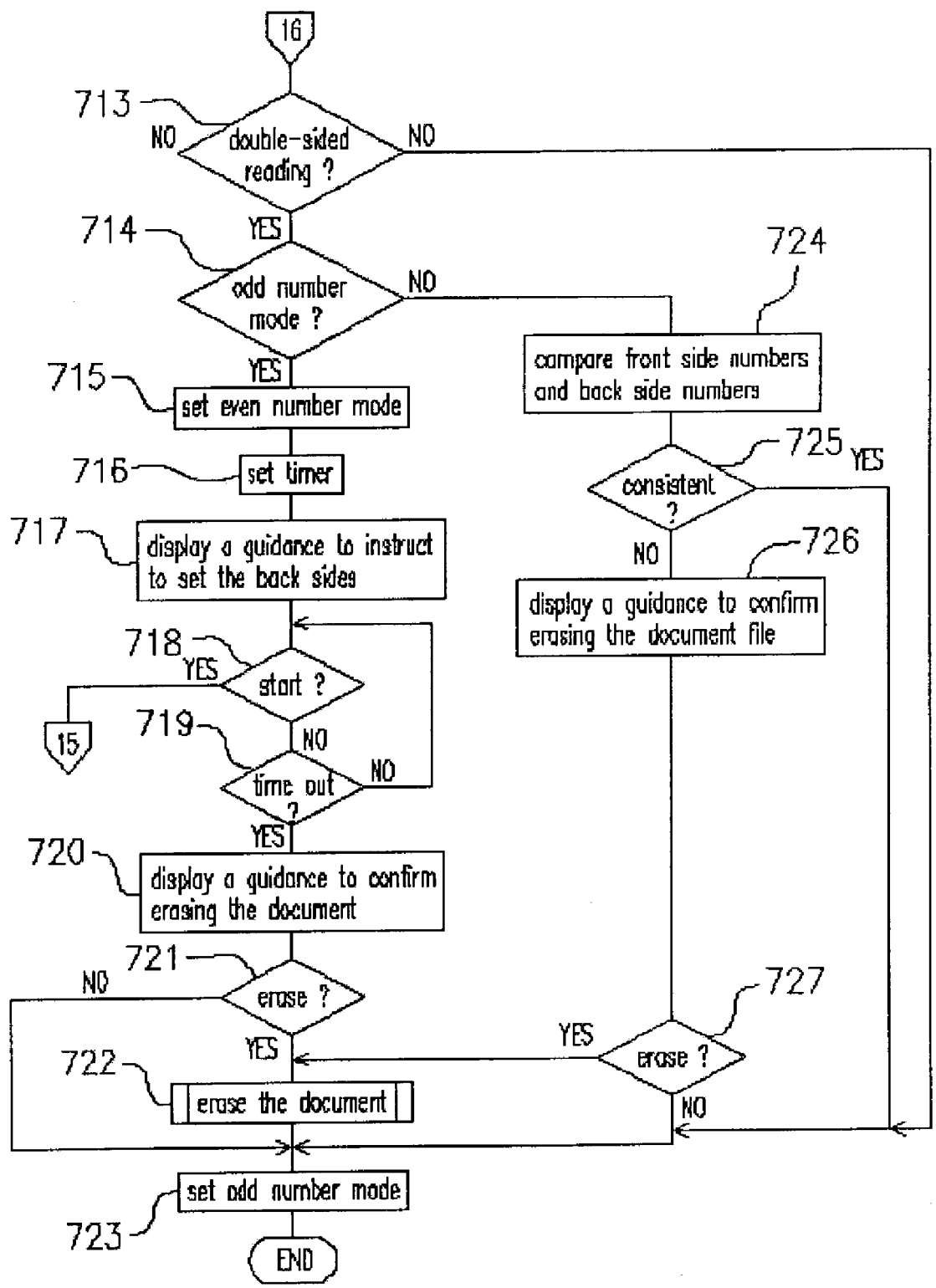

FIGS. 16 and 17 show an example of another manuscript reading process. Because the embodiment has double-sided manuscript reading mode, it is necessary to be able to recognize that the currently reading manuscript is a front side or a back side. The present embodiment includes a reading side mode flag to store the currently reading manuscript is a front side or a back side. Before the first reading operation, an odd number mode (a front side reading mode) is set to the reading side mode flag.

As the manuscripts to be read are set on the scanner 5 and a reading start is instructed, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 701). In addition, during executing Step 701, a guidance message, e.g., shown in FIG. 5C, is displayed on the liquid crystal display 7j to inform a user with a message that the manuscript reading process is ongoing.

As one page of the manuscript set has been read, the process checks as to whether a next page is put on the manuscript input tray (Step 702). When a determination result of Step 702 is "YES", the process returns to Step 701 to read the other manuscripts. When there is no manuscript to be read on the manuscript input tray, i.e., the determination result of Step 702 is "NO", the front sides of one manuscript or the reading operation comes to an end. At this time, the process checks as to whether the successive manuscript reading mode is set (Step 703).

When a determination result of Step 703 is "YES", a timer for counting a prescribed time, e.g., 30 seconds, is set (started) at Step 704, and a guidance message that the manuscript can be set as shown in FIG. 5E is displayed (Step 705). Under this condition, the process checks as to whether the start key 7a is pressed or checks as to whether the "#" key for acknowledging a message of no additional manuscripts until the timer set (started) at Step 604 reaches a time out (a NO loop of Steps 706, 707 and 708).

When the start key 7a is pressed until the timer set (started) at Step 704 reaches a time out and a determination result of Step 706 is "YES", the process returns to Step 701 to performing a manuscript reading process for the next manuscript set.

In addition, when the start key 7a or the "#" key is not pressed until the timer set (started) at Step 704 reaches a time out and a determination result of Step 708 is "YES", a proper manuscript set operation is not performed. In this situation, a guidance message for asking as to whether the document file is erased as shown in FIG. 6A is displayed (Step 709) to confirm whether the user wants to erase the document file (Step 710). When the user wants to erase the document file and when a determination result of Step 710 is "YES", the image data file (document) stored at this time is erased (Step 711). Then, an odd number mode value is set to the reading side mode flag (Step 712) to end the reading operation at this time (error end).

On the other hand, when the "#" key is pressed until the timer set (started) at Step 704 reaches a time out, a determination result of Step 707 is "YES", the user does not want to erase the document file in response to the guidance message displayed at Step 709, and when a determination result of Step 710 is "NO", the process moves to the back side reading operation. Namely, whether the double-sided manuscript reading mode is set is first checked (Step 713). When a determination result of Step 713 is "YES", the process checks whether a value of the odd number mode is set to the currently reading side mode flag (Step 714). When the odd number mode is set to the currently reading side mode flag, i.e., a determination result of Step 713 is "YES", the double-sided manuscript reading mode is set and the front side reading operation is finished.

Therefore, a value of an even number mode is set to the currently reading side mode flag (Step 715), and the timer for counting a prescribed time, e.g., 30 seconds, is set (started) at Step 716. Then, a guidance to instruct to set the back sides as shown in FIG. 6C is displayed (Step 717). Under this condition, the process checks as to whether the start key 7a is pressed until the timer set (started) at Step 716 reaches a time out (a NO loop of Steps 718 and 719).

When the start key 7a is pressed until the timer set (started) at Step 716 reaches the time out and a determination result of Step 718 is "YES, the process returns to Step 701 to perform the manuscript reading process for the back sides of the next manuscript set. In addition, when the start key 7a is not pressed until the timer set (started) at Step 716 reaches the time out and a determination result of Step 719 is "YES, a proper manuscript set operation is not performed. In this situation, a guidance message for asking as to whether the document file is erased as shown in FIG. 6A is displayed (Step 720) to confirm whether the user wants to erase the document file (Step 721). When the user wants to erase the document file and when a determination result of Step 721 is "YES", the image data file (document file) stored at this time is erased (Step 722). Then, an odd number mode value is set to the reading side mode flag (Step 723) to end the reading operation at this time.

On the other hand, when the user does not want to erase the document file in response to the guidance message displayed at Step 720, and when a determination result of Step 721 is "NO", the process moves to Step 723. Then, an odd number mode value is set to the reading side mode flag to finish the reading operation at this time.

When the successive manuscript reading mode is not set and a determination result of Step 703 is "NO", the process proceeds to Step 713 to perform the subsequent Steps. When a determination result of Step 713 is "NO", the process proceeds to Step 723 to set the odd number mode value to the reading side mode flag, and then finishes the manuscript reading process.

When a determination result of Step 714 is "NO", the double-sided reading operation for all manuscript sets is finished. Therefore, a number of the front sides and a number of back sides are compared (Step 724) to checks as to whether the numbers of the front sides and the back sides are consistent (Step 725). When a determination result of Step 725 is "YES", because a proper manuscript reading operation is finished, the process proceeds to Step 723 to set an odd number mode value to the reading side mode flag, and then terminates the reading operation.

Figure 6E:
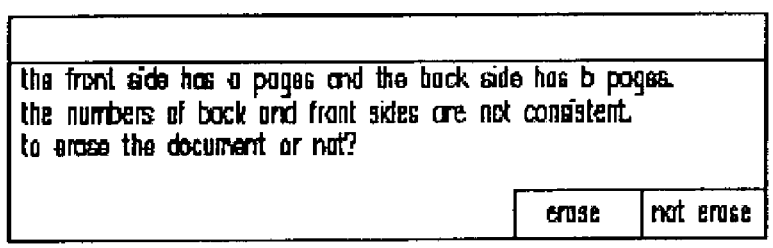

On the other hand, when a determination result of Step 725 is "NO", it is a situation that the numbers of the front sides and the back sides are not consistent, and there is also a possibility of a wrong operation for the manuscript set. In this situation, as shown in FIG. 6D, a guidance message inquiring of the user whether the document file is erased because the numbers of the front sides and the back sides of the manuscript set are not consistent, is displayed (Step 726) so as to confirm whether the user wants to erase the document file (Step 727). In addition, for example, if the guidance message displayed at Step 726 comprises a display of reading pages of the front sides and the back sides as shown in FIG. 6E, the user can confirm the wrong operation of the scanner 5 during the reading operation; so that the process is very effective.

When the user wants to erase the document file and a determination result of Step 727 is "YES", the process proceeds to Step 722 to erase the image data file stored at that time. Then, an odd number mode value is set to the reading side mode flag (Step 723), and the reading operation is terminated. In addition, when a determination result of Step 727 is "NO", the process proceeds to Step 723 to set an odd number mode value to the reading side mode flag and terminates the reading operation.

Regarding the guidance message, for example, during executing the NO loop of Steps 706, 707 and 708 and executing the NO loop of Steps 718, 719, a guidance message to display that the manuscript is being stored as shown in FIG. 5C can be added, in order to inform the user clearly of a message that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then he reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be aware of a continuous condition of the reading operation, which is very effective.

Furthermore, when the reading operation of the manuscript set is finished, the process can proceed to the double-sided manuscript reading mode by pressing the "#" key. Therefore, the time required to read the manuscript set can be reduced.

When an operation to put the manuscript set onto the manuscript input tray is interrupted, an image data file (a document file) made of read data till now is erased. Therefore, when the user makes an operation to mistake an order of the manuscript set during the manuscript reading operation, the user is not necessary to make an operation to erase the document file during the mistaken reading operation; so that it is very convenient. In addition, because the read document files can be erased halfway, when the user disorders an order of the manuscript set or makes a wrong operation, it is not necessary for the user to erase the document file during the mistaken reading operation; so that it is very convenient.

For various manuscript sets, when the numbers of the front sides and the back sides are not consistent, it is a situation with a possibility that the user makes a wrong operation for the manuscript set. In this situation, because the user is inquired whether the image data file made of read data till now is erased and a document erasing operation is performed complying with the user's wish, for example when the back side of the final page of certain manuscript set is blank, the reading operation till now will not be useless; and this is very convenient. In addition, because the read document file is erased according to the user's wish, it is not necessary for the user on to erase the document file when a wrong operation is made; so that it is very convenient.

Figure 18:
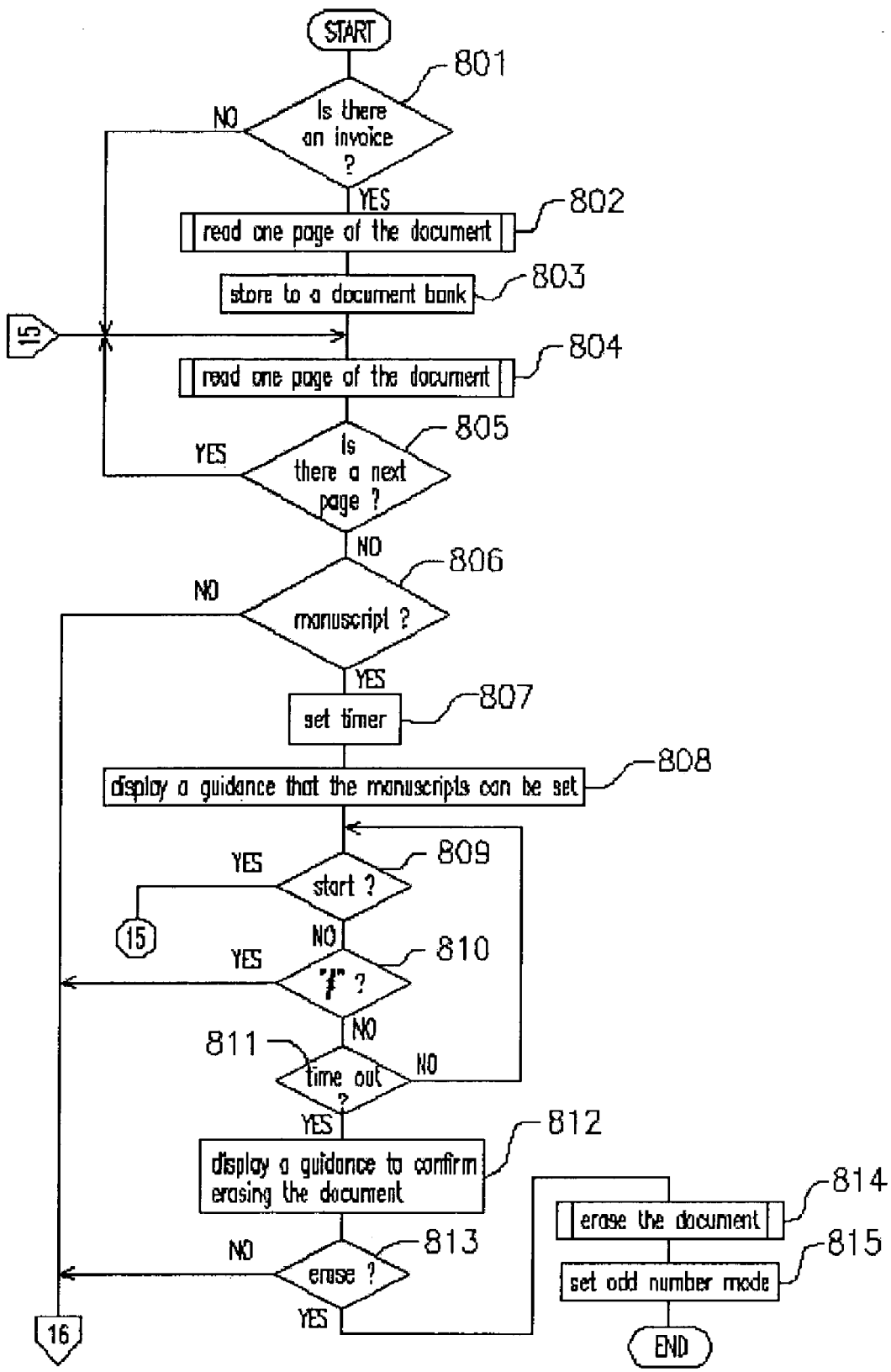
FIGS. 18 and 19 show an example of another manuscript reading process.
Figure 19:
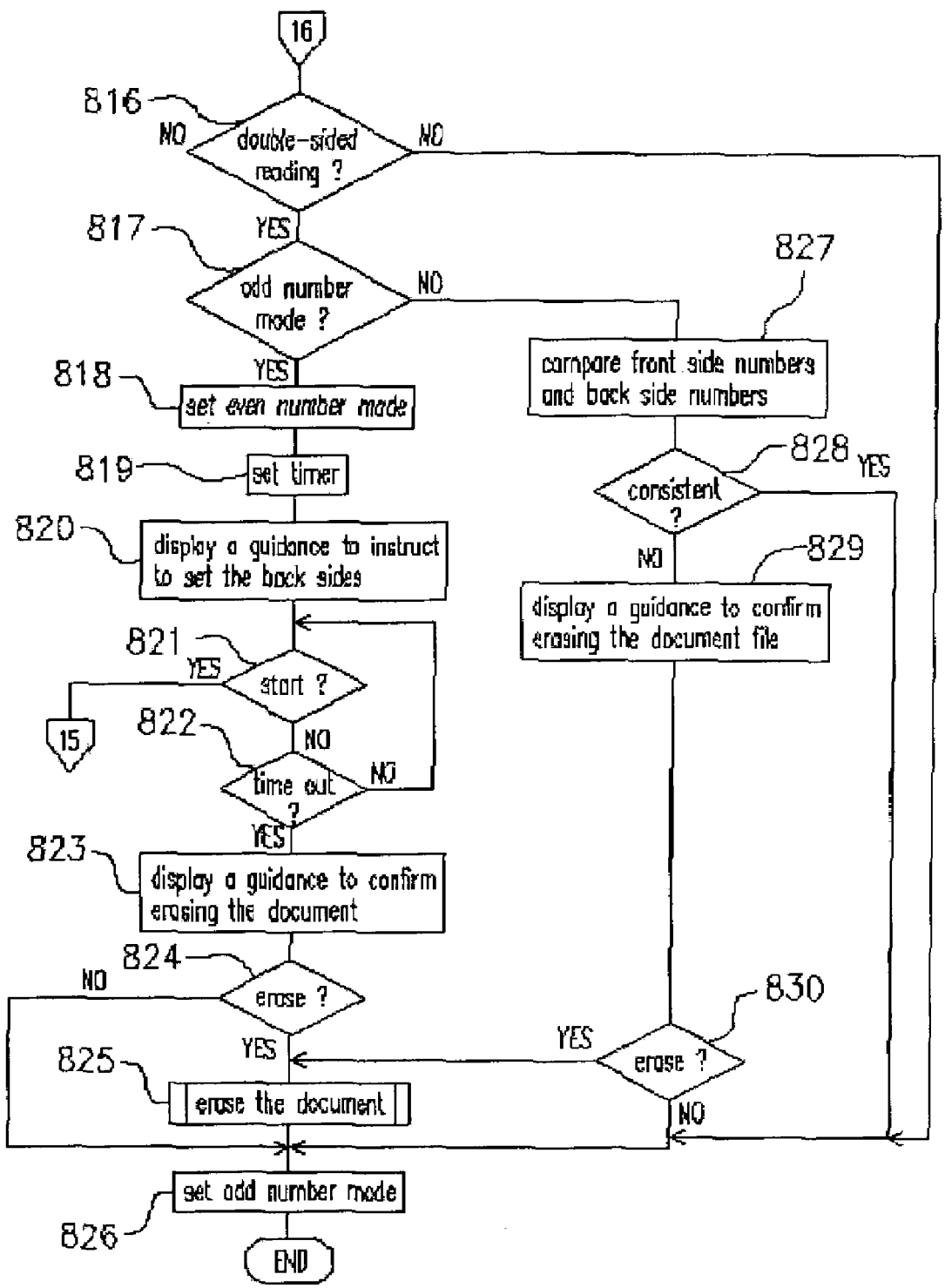

FIGS. 18 and 19 show an example of another manuscript reading process. In this case, the present embodiment is suitable for a case that a manuscript of an invoice is added to the front page to be transmitted. In this embodiment, image information of the invoice is registered to a document bank and the following manuscripts are handled as a transmission manuscript file. In addition, during the transmission, image information of the invoice registered in the document bank is used as image information of the first page and then transmitted.

Because the embodiment has double-sided manuscript reading mode, it is necessary to be able to recognize that the currently reading manuscript is a front side or a back side. The present embodiment includes a reading side mode flag to store the currently reading manuscript is a front side or a back side. Before the first reading operation, an odd number mode (a front side reading mode) is set to the reading side mode flag.

As the manuscripts to be read are set on the scanner 5 and a reading start is instructed, the process checks as to whether a message that an invoice manuscript is added is specified by a user (Step 801). The scanner 5 is activated and one of the manuscripts to be read is separated and transported from the manuscript input tray, and at the same time, a manuscript image of the reading side of the manuscript is read (Step 802). Image data obtained by this way are used as image data of the invoice and registered to a document bank (Step 803).

Thereafter, an ordinary reading operation is performed to following manuscripts. In addition, when a message that a manuscript of the invoice is not added is not specified and when a determination result of Step 801 is "NO", an ordinary reading operation is performed at the beginning.

In the ordinary reading operation, the scanner 5 is activated and one of the manuscripts to be read is separated and transported from the manuscript input tray, and at the same time, a manuscript image of the reading side of the manuscript is read. Image data obtained by this way are stored to a prescribed location of a work area according to a value of the reading side mode flag and an order of reading pages at this time (Step 804). In addition, during executing Step 804, a guidance message, e.g., shown in FIG. 5C, is displayed on the liquid crystal display 7j to inform a user of a message of the manuscript reading process being processed.

As one page of the manuscript set has been read, the process checks as to whether a next page is put on the manuscript input tray (Step 805). When a determination result of Step 805 is "YES", the process returns to Step 804 to read the other manuscripts. When there is no manuscript to be read on the manuscript input tray, i.e., the determination result of Step 805 is "NO", the front sides of one manuscript or the reading operation comes to an end. At this time, the process checks as to whether the successive manuscript reading mode is set (Step 806).

When a determination result of Step 806 is "YES", a timer for counting a prescribed time, e.g., 30 seconds, is set (started) at Step 807, and a guidance message that the manuscript can be set as shown in FIG. 5E is displayed (Step 808). Under this condition, the process checks as to whether the start key 7a is pressed or checks as to whether the "#" key for acknowledging a message of no additional manuscripts until the timer set (started) at Step 604 reaches a time out (a NO loop of Steps 809, 810 and 811).

When the start key 7a is pressed until the timer set (started) at Step 807 reaches a time out and a determination result of Step 809 is "YES", the process returns to Step 804 to performing a manuscript reading process for the next manuscript set.

In addition, when the start key 7a or the "#" key is not pressed until the timer set (started) at Step 807 reaches a time out and a determination result of Step 811 is "YES", a proper manuscript set operation is not performed. In this situation, a guidance message for asking as to whether the document file is erased as shown in FIG. 6A is displayed (Step 812) to confirm whether the user wants to erase the document file (Step 813). When the user wants to erase the document file and when a determination result of Step 813 is "YES", the image data file (document) stored at this time is erased (Step 814). Then, an odd number mode value is set to the reading side mode flag (Step 815) to end the reading operation at this time (error end).

On the other hand, when the "#" key is pressed until the timer set (started) at Step 803 reaches a time out, a determination result of Step 810 is "YES", the user does not want to erase the document file in response to the guidance message displayed at Step 812, and when a determination result of Step 813 is "NO", the process moves to the back side reading operation. Namely, whether the double-sided manuscript reading mode is set is first checked (Step 816). When a determination result of Step 816 is "YES", the process checks whether a value of the odd number mode is set to the currently reading side mode flag (Step 817). When the odd number mode is set to the currently reading side mode flag, i.e., a determination result of Step 816 is "YES", the double-sided manuscript reading mode is set and the front side reading operation is finished.

Therefore, a value of an even number mode is set to the currently reading side mode flag (Step 818), and the timer for counting a prescribed time, e.g., 30 seconds, is set (started) at Step 819. Then, a guidance to instruct to set the back sides as shown in FIG. 6C is displayed (Step 820). Under this condition, the process checks as to whether the start key 7a is pressed until the timer set (started) at Step 819 reaches a time out (a NO loop of Steps 821 and 822).

When the start key 7a is pressed until the timer set (started) at Step 819 reaches the time out and a determination result of Step 822 is "YES, the process returns to Step 804 to perform the manuscript reading process for the back sides of the next manuscript set. In addition, when the start key 7a is not pressed until the timer set (started) at Step 819 reaches the time out and a determination result of Step 822 is "YES, a proper manuscript set operation is not performed. In this situation, a guidance message for asking as to whether the document file is erased as shown in FIG. 6A is displayed (Step 823) to confirm whether the user wants to erase the document file (Step 824). In addition, for example, if the guidance message displayed at Step 823 comprises a display of reading pages of the front sides and the back sides as shown in FIG. 6E, the user can confirm the wrong operation of the scanner 5 during the reading operation, so that the process is very effective.

When the user wants to erase the document file and when a determination result of Step 824 is "YES", the image data file (document file) stored at this time is erased (Step 825). Then, an odd number mode value is set to the reading side mode flag (Step 826) to end the reading operation at this time.

On the other hand, when the user does not want to erase the document file in response to the guidance message displayed at Step 823, and when a determination result of Step 824 is "NO", the process moves to Step 826. Then, an odd number mode value is set to the reading side mode flag to finish the reading operation at this time.

When the successive manuscript reading mode is not set and a determination result of Step 806 is "NO", the process proceeds to Step 816 to perform the subsequent Steps. When a determination result of Step 816 is "NO", the process proceeds to Step 826 to set the odd number mode value to the reading side mode flag, and then finishes the manuscript reading process.

When a determination result of Step 817 is "NO", the double-sided reading operation for all manuscript sets is finished. Therefore, a number of the front sides and a number of back sides are compared (Step 827) to checks as to whether the numbers of the front sides and the back sides are consistent (Step 828). When a determination result of Step 828 is "YES", because a proper manuscript reading operation is finished, the process proceeds to Step 826 to set an odd number mode value to the reading side mode flag, and then terminates the reading operation.

On the other hand, when a determination result of Step 828 is "NO", it is a situation that the numbers of the front sides and the back sides are not consistent, and there is also a possibility of a wrong operation for the manuscript set. In this situation, as shown in FIG. 6D, a guidance message, which is to inquire the user whether the document file is erased because the numbers of the front sides and the back sides of the manuscript set are not consistent, is displayed (Step 829) so as to confirm whether the user want to erase the document file (Step 830).

When the user wants to erase the document file and a determination result of Step 830 is "YES", the process proceeds to Step 825 to erase the image data file stored at that time. Then, an odd number mode value is set to the reading side mode flag (Step 826), and the reading operation is terminated (error end).

In addition, when a determination result of Step 830 is "NO", the process proceeds to Step 826 to set an odd number mode value to the reading side mode flag and terminates the reading operation.

Regarding the guidance message, for example, during executing the NO loop of Steps 809, 810 and 811 and executing the NO loop of Steps 821, 822, a guidance message to display that the manuscript is being stored as shown in FIG. 5C can be added, in order to inform the user clearly of a message that image data is being stored and the manuscript is kept to be read.

According to the embodiment described above, when both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be aware of a continuous condition of the reading operation, which is very effective.

Furthermore, when the reading operation of the manuscript set is finished, the process can proceed to the double-sided manuscript reading mode by pressing the "#" key. Therefore, the time required to read the manuscript set can be reduced.

When an operation to put the manuscript set onto the manuscript input tray is interrupted, an image data file (a document file) made of read data till now is erased. Therefore, when the user makes an operation to mistake an order of the manuscript set during the manuscript reading operation, the user is not necessary to make an operation to erase the document file during the mistook reading operation, so that it is very convenient. In addition, because the read document files can be erased halfway, when the user disorders an order of the manuscript set or makes a wrong operation, the user is not necessary to make an operation to erase the document file during the mistook reading operation, so that it is very convenient.

For various manuscript sets, when the numbers of the front sides and the back sides are not consistent, it is a situation with a possibility that the user makes a wrong operation for the manuscript set. In this situation, because the user is inquired whether the image data file made of read data till now is erased and a document erasing operation is performed complying with the user's wish, for example when the back side of the final page of certain manuscript set is blank, the reading operation till now will not be useless, which is very convenient. In addition, because the read document file is erased according to the user's wish, the user is not necessary to make an operation to erase the document file when a wrong operation is made, so that it is very convenient.

Moreover, even though a transmission manuscript of an invoice is added to the front, the successive manuscript reading mode and the double-sided manuscript reading mode can also be suitable.

In the aforementioned embodiments, the present invention is described by using the G3 facsimile apparatus. However, the present invention is also applicable and suitable for other apparatuses with manuscript reading functions.

In summary, according to the embodiments of the present invention described above, the present invention can have effects as follows. When both the double-sided manuscript reading mode and the successive manuscript reading mode are specified, the reading operation of the successive manuscript reading mode for the front sides is performed, and then the reading operation of the successive manuscript reading mode for the back sides is performed. Therefore, when the user processes a large amount of manuscripts to be read, the operational process can become smooth. Differences between the manuscript sets and differences distinguishing the front side from back side, etc. can be tremendously reduced. Therefore, the reading operation becomes very convenient.

Additionally, the process informs the user of a message to set the next manuscript set by pressing the start key 7a after one manuscript set (the front side or the back side manuscript set) has been read. Therefore, the user can be aware of a continuous condition of the reading operation, which is very effective.

Furthermore, by a particular operation, a message informing the user that the reading operation of the manuscript is finished, the time required to read the manuscript set can be reduced.

In addition, according to one aspect of the present invention, when an operation to put the manuscript set onto the manuscript input tray is interrupted, an image data file (a document file) made of read data till now is erased. Therefore, when the user makes an operation to mistake an order of the manuscript set during the manuscript reading operation, it is not necessary for the user to erase the document file during the mistaken reading operation; so that it is very convenient. In addition, because the read document files can be erased halfway, when the user disorders an order of the manuscript set or makes a wrong operation, it is not necessary for the user is to erase the document file during the mistaken reading operation. A very effective result can be obtained.

In addition, according to one aspect of the present invention, because the user is inquired as to whether the image data file made of read data till now is erased and a document erasing operation is performed complying with the user's wish, in a case that the user takes time in the operation, the reading operation till now will not be useless, which is very convenient. In addition, because the read document file can be erased halfway, when the user disorders an order of the manuscript set or makes a wrong operation, it is not necessary for the user to erase the document file during the mistaken reading operation. A very effective result can be obtained.

In addition, according to one aspect of the present invention, for various manuscript sets, when the numbers of the front sides and the back sides are not consistent, it is a situation with a possibility that the user makes a wrong operation for the manuscript set. Because the read document file is erased according to the user's wish, it is not necessary for the to erase the document file when a wrong operation is made; so that it is very convenient. A very effective result can be obtained.

In addition, according to one aspect of the present invention, even though a transmission manuscript of an invoice is added to the front, the successive manuscript reading mode and the double-sided manuscript reading mode can also be suitable, so that it is very convenient. A very effective result can be obtained.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention. This application claims the priority benefit of Japanese application serial nos. 2002-057032 and 2002-347141, filed on Mar. 4, 2002 and Nov. 29, 2002, respectively, the entire contents of which are hereby incorporated by reference herein.

What is claimed is:

1. An image processing apparatus, comprising:
a manuscript automatic conveying function for separating one by one a plurality of manuscripts to be read that are set on a manuscript input tray;
an image processing function for reading and storing single-sided images of the plurality of the manuscripts separated by the manuscript automatic conveying function;
a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, when setting of a next manuscript set within a prescribed time from an end of a manuscript reading operation for one manuscript set is confirmed, a reading operation for the next manuscript set is executed, and wherein when setting of the next manuscript set is not confirmed within a prescribed time from an end of the manuscript reading operation, a back side reading operation of the double-sided manuscript reading mode is executed, in the back side reading operation, as setting back sides of the next manuscript set within the prescribed time from an end of the manuscript reading operation for back sides of the one manuscript set is confirmed, the back side reading operation for the next manuscript set is executed.

2. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a first guidance message to prompt a user to set a next manuscript set is displayed, and then as setting the next manuscript set within a prescribed time from starting displaying the first guidance message, a reading operation for the next manuscript set is executed, and wherein when setting of the next manuscript set within the prescribed time from starting displaying the first guidance message is not confirmed, a second guidance message to prompt the user to set back sides of the one manuscript set on the manuscript input tray is displayed, and then a back side reading operation of the double-sided manuscript reading mode is executed, in the back side reading operation, as the manuscript reading operation for back sides of the one manuscript set is finished, a third guidance message to prompt a user to set back sides of a next manuscript set is displayed, and then as setting the back sides of the next manuscript set is confirmed within a prescribed time from starting displaying the third guidance message, a reading operation for the back sides of the next manuscript set is executed.

3. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, a manuscript reading operation for one manuscript set is finished, a next manuscript set is set and a first guidance message to prompt a user with a setting finish/confirm operation is displayed, and then as an input of the setting finish/confirm operation is detected within a prescribed time from starting displaying the first guidance message, a reading operation for the next manuscript set is executed, and wherein when the input of the setting finish/confirm operation is not detected within a prescribed time from starting displaying the first guidance message, back sides of the one manuscript set are set on the manuscript input tray and a second guidance message to prompt the user with a setting finish/confirm operation is displayed, a back side reading operation of the double-sided manuscript reading mode is executed, in the back side reading operation, as the manuscript reading operation for back sides of the one manuscript set is finished, back sides of a next manuscript set are set and a third guidance message to prompt a user with a setting finish/confirm operation is displayed, and then as an input of the setting finish/confirm operation is detected within a prescribed time from starting displaying the third guidance message, a back side reading operation for the next manuscript set is executed.

4. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when the input of the setting finish/confirm operation is not detected or the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and wherein as the input of the setting finish/confirm operation is not detected within the prescribed time from starting displaying the third guidance message or the message of finishing the reading of the final manuscript set is detected, the reading operation is finished.

5. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a reading operation at this time is terminated with errors and image data that has been read and stored till now is erased, and wherein when the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and wherein as the input of the setting finish/confirm operation input of the finished and confirmed operation is not detected within the prescribed time from starting displaying the third guidance message, a reading operation at this time is terminated with errors and image data that has been read and stored till now is erased, and wherein when the message of finishing the reading of the final manuscript set is detected within a prescribed time from starting displaying the third guidance message, the reading operation is finished.

6. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when the input of the setting finish/confirm operation is not detected or the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and wherein as the input of the setting finish/confirm operation is not detected within the prescribed time from starting displaying the third guidance message, the reading operation is finished.

7. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a reading operation at this time is terminated with errors and image data that has been read and stored till now is erased, and wherein when the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation, and then as an input of the setting finish/confirm operation is detected within a prescribed time from starting displaying the third guidance message, a back side reading operation for the next manuscript set is executed, and wherein as the input of the setting finish/confirm operation is not detected within the prescribed time from starting displaying the third guidance message, a reading operation at this time is terminated with errors and image data that has been read and stored till now is erased.

8. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a second guidance message to prompt a user to select as to whether a document is to be erased is displayed, and when the user specifies a message to erase the document in response to the second guidance message, a reading operation at this time is terminated with errors and image data that has been read and stored till now is erased, and wherein when the message of finishing the reading of the final manuscript set is detected within a prescribed time from staffing displaying the first guidance message or the user does not specify the message to erase the document in response to the second guidance message, back sides of an initial manuscript set are set on the manuscript input tray and a third guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a fourth guidance message to prompt a user to input a message of performing a setting finish/confirm operation or finishing the reading of the final manuscript set is displayed, and then as an input of the setting finish/confirm operation is detected within a prescribed time from starting displaying the fourth guidance message, a back side reading operation for the next manuscript set is executed, and wherein as the input of the setting finish/confirm operation is not detected within the prescribed time from starting displaying the third guidance message, a fifth guidance message to prompt a user to select as to whether a document is to be erased is displayed, and when the user specifies the message to erase the document in response to the fifth guidance message, a reading operation at this time is terminated with errors and image data that has been read and stored till now is erased, and wherein when the message of finishing the reading of the final manuscript set is detected within a prescribed time from starting displaying the fourth guidance message or the user does not specify the message to erase the document in response to the fifth guidance message, the reading operation is finished.

9. An image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a second guidance message to prompt a user to select as to whether a document is to be erased is displayed, and when the user specifies a message to erase the document in response to the second guidance message, a reading operation at this time is terminated with errors and image data that has been read and stored till now is erased, and wherein when the message of finishing the reading of the final manuscript set is detected within a prescribed time from starting displaying the first guidance message, back sides of an initial manuscript set are set on the manuscript input tray and a third guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a fourth guidance message to prompt a user to input a message of performing a setting finish/confirm operation, and then as an input of the setting finish/confirm operation is detected within a prescribed time from starting displaying the fourth guidance message, a back side reading operation for the next manuscript set is executed, and wherein as the input of the setting finish/confirm operation is not detected within the prescribed time from starting displaying the third guidance message, a fifth guidance message to prompt a user to select as to whether a document is to be erased is displayed, and when the user specifies the message to erase the document in response to the fifth guidance message, a reading operation at this time is terminated with errors and image data that has been read and stored till now is erased, and wherein when the user does not specify the message to erase the document in response to the fifth guidance message, the reading operation is finished.

10. The image processing apparatus of any one of claims 1 to 3, and 5 to 9, wherein in the back side reading operation, whether a number of back side of the manuscript set and a number of corresponding front sides of the manuscript set are consistent is checked, and when the numbers of the front and the back sides are consistent, the reading operation continues; otherwise the reading operation at this time is terminated with errors and image data that has been read and stored till now is erased.

11. The image processing apparatus of any one of claims 1 to 3, and 5 to 9, wherein in the back side reading operation, whether a number of back side of the manuscript set and a number of corresponding front sides of the manuscript set are consistent is checked, and when the numbers of the front and the back sides are consistent, the reading operation continues, when the numbers of the front and the back sides are not consistent, a guidance message to prompt a user to select as to whether a document is to be erased is displayed, and when the user specifies the message to erase the document in response to the fifth guidance message, a reading operation at this time is terminated with errors and image data that have been read and stored till now are erased, and wherein when the user does not specify the message to erase the document in response to the guidance message, the reading operation continues.

12. The image processing apparatus of any one of claim 10, wherein when a specified additional manuscript is added to a front page, the front page and other manuscripts are handled separately, and image data obtained by reading the front page is handled separately.

13. A method for controlling an image processing apparatus, comprising:
   a manuscript automatic conveying function for separating one by one a plurality of manuscripts to be read that are set on a manuscript input tray;
   an image processing function for reading and storing single-sided images of the plurality of the manuscripts separated by the manuscript automatic conveying function;
   a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and
   a double-sided manuscript reading mode for reading images of two sides of the plurality of the manuscripts,
   wherein when both the successive manuscript reading mode and the double-sided manuscript reading mode are set, a successive manuscript reading operation is performed for back sides after a double-sided manuscript reading operation for front sides is finished,
   in the successive manuscript reading operation, when setting of a next manuscript set within a prescribed time from an end of a manuscript reading operation for one manuscript set is confirmed, a reading operation for the next manuscript set is executed, and
   wherein when setting of the next manuscript set is not confirmed within a prescribed time from an end of the manuscript reading operation, a back side reading operation of the double-sided manuscript reading mode is executed,
   in the back side reading operation, as setting back sides of the next manuscript set within the prescribed time from an end of the manuscript reading operation for back sides of the one manuscript set is confirmed, the back side reading operation for the next manuscript set is executed.

14. A method for controlling an image processing apparatus, comprising:
   a manuscript automatic conveying function for separating one by one a plurality of manuscripts to be read that are set on a manuscript input tray;
   an image processing function for reading and storing single-sided images of the plurality of the manuscripts separated by the manuscript automatic conveying function;
   a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and
   a double-sided manuscript reading mode for reading images of two sides of the plurality of the manuscripts,
   wherein when both the successive manuscript reading mode and the double-sided manuscript reading mode are set, a successive manuscript reading operation is performed for back sides after a double-sided manuscript reading operation for front sides is finished,
   in the successive manuscript reading operation, as a manuscript reading operation for one manuscript set is finished, a first guidance message to prompt a user to set a next manuscript set is displayed, and then as setting the next manuscript set within a prescribed time from starting displaying the first guidance message, a reading operation for the next manuscript set is executed, and
   wherein when setting of the next manuscript set within the prescribed time from starting displaying the first guidance message is not confirmed, a second guidance message to prompt the user to set back sides of the one manuscript set on the manuscript input tray is displayed, and then a back side reading operation of the double-sided manuscript reading mode is executed,
   in the back side reading operation, as the manuscript reading operation for back sides of the one manuscript set is finished, a third guidance message to prompt a user to set back sides of a next manuscript set is displayed, and then as setting the back sides of the next manuscript set is confirmed within a prescribed time from starting displaying the third guidance message, a reading operation for the back sides of the next manuscript set is executed.

15. A method for controlling an image processing apparatus, comprising:
   a manuscript automatic conveying function for separating one by one a plurality of manuscripts to be read that are set on a manuscript input tray;
   an image processing function for reading and storing single-sided images of the plurality of the manuscripts separated by the manuscript automatic conveying function;
   a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and
   a double-sided manuscript reading mode for reading images of two sides of the plurality of the manuscripts,
   wherein when both the successive manuscript reading mode and the double-sided manuscript reading mode are set, a successive manuscript reading operation is performed for back sides after a double-sided manuscript reading operation for front sides is finished,
   in the successive manuscript reading operation, a manuscript reading operation for one manuscript set is finished, a next manuscript set is set and a first guidance message to prompt a user with a setting finish/confirm operation is displayed, and then as an input of the setting finish/confirm operation is detected within a prescribed time from starting displaying the first guidance message, a reading operation for the next manuscript set is executed, and
   wherein when the input of the setting finish/confirm operation is not detected within a prescribed time from starting displaying the first guidance message, back sides of the one manuscript set are set on the manuscript input tray and a second guidance message to prompt the user with a setting finish/confirm operation is displayed, a back side reading operation of the double-sided manuscript reading mode is executed,
   in the back side reading operation, as the manuscript reading operation for back sides of the one manuscript set is finished, back sides of a next manuscript set are set and a third guidance message to prompt a user with a setting finish/confirm operation is displayed, and then as an input of the setting finish/confirm operation is detected within a prescribed time from starting displaying the third guidance message, a back side reading operation for the next manuscript set is executed.

16. A method for controlling an image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when the input of the setting finish/confirm operation is not detected or the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and wherein as the input of the setting finish/confirm operation is not detected within the prescribed time from starting displaying the third guidance message or the message of finishing the reading of the final manuscript set is detected, the reading operation is finished.

17. A method for controlling an image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a reading operation at this time is terminated with errors and image data that has been read and stored till now is erased, and wherein when the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and wherein as the input of the setting finish/confirm operation is not detected within the prescribed time from starting displaying the third guidance message, a reading operation at this time is terminated with errors and image data that has been read and stored till now is erased, and wherein when the message of finishing the reading of the final manuscript set is detected within a prescribed time from starting displaying the third guidance message, the reading operation is finished.

18. A method for controlling an image processing apparatus, comprising:
a manuscript automatic conveying function for separating one by one a plurality of manuscripts to be read that are set on a manuscript input tray;
an image processing function for reading and storing single-sided images of the plurality of the manuscripts separated by the manuscript automatic conveying function;
a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and
a double-sided manuscript reading mode for reading images of two sides of the plurality of the manuscripts,
wherein when both the successive manuscript reading mode and the double-sided manuscript reading mode are set, a successive manuscript reading operation is performed for back sides after a double-sided manuscript reading operation for front sides is finished,
in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and
wherein when the input of the setting finish/confirm operation is not detected or the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed,
in the back side reading operation, as the manuscript reading operation for back sides of the one manuscript set is finished, back sides of a next manuscript set are set and a third guidance message to prompt a user to input a message of performing a setting finish/confirm operation or finishing the reading of the final manuscript set is displayed, and then as an input of the setting finish/confirm operation is detected within a prescribed time from starting displaying the third guidance message, a back side reading operation for the next manuscript set is executed, and
wherein as the input of the setting finish/confirm operation is not detected within the prescribed time from starting displaying the third guidance message, the reading operation is finished.

19. A method for controlling an image processing apparatus, comprising:
a manuscript automatic conveying function for separating one by one a plurality of manuscripts to be read that are set on a manuscript input tray;
an image processing function for reading and storing single-sided images of the plurality of the manuscripts separated by the manuscript automatic conveying function;
a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and
a double-sided manuscript reading mode for reading images of two sides of the plurality of the manuscripts,
wherein when both the successive manuscript reading mode and the double-sided manuscript reading mode are set, a successive manuscript reading operation is performed for back sides after a double-sided manuscript reading operation for front sides is finished,
in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and
wherein when input of the setting finish/confirm operation is not detected within a prescribed time from starting displaying the first guidance message, a reading operation at this time is terminated with errors and image data that has been read and stored till now is erased, and
wherein when the message of finishing the reading of the final manuscript set is detected within a prescribed time from starting displaying the first guidance message, back sides of an initial manuscript set are set on the manuscript input tray and a second guidance message to prompt the user with a setting finish/confirm operation is displayed, and then a back side reading operation of the double-sided manuscript reading mode is executed,
in the back side reading operation, as the manuscript reading operation for back sides of the one manuscript set is finished, back sides of a next manuscript set are set and a third guidance message to prompt a user to input a message of performing a setting finish/confirm operation, and then as an input of the setting finish/confirm operation is detected within a prescribed time from starting displaying the third guidance message, a back side reading operation for the next manuscript set is executed, and
wherein as the input of the setting finish/confirm operation is not detected within the prescribed time from starting displaying the third guidance message, a reading operation at this time is terminated with errors and image data that has been read and stored till now is erased.

20. A method for controlling an image processing apparatus, comprising:
a manuscript automatic conveying function for separating one by one a plurality of manuscripts to be read that are set on a manuscript input tray;
an image processing function for reading and storing single-sided images of the plurality of the manuscripts separated by the manuscript automatic conveying function;
a successive manuscript reading mode where a plurality of manuscript sets respectively comprising a plurality of pages of the manuscripts are sequentially put on the manuscript input tray, image data obtained by reading the manuscripts of the plurality of the manuscript sets is collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a second guidance message to prompt a user to select as to whether a document is to be erased is displayed, and when the user specifies a message to erase the document in response to the second guidance message, a reading operation at this time is terminated with errors and image data that has been read and stored till now is erased, and wherein when the message of finishing the reading of the final manuscript set is detected within a prescribed time from starting displaying the first guidance message or the user does not specify the message to erase the document in response to the second guidance message, back sides of an initial manuscript set are set on the manuscript input tray and a third guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a fourth guidance message to prompt a user to input a message of performing a setting finish/confirm operation or finishing the reading of the final manuscript set is displayed, and then as an input of the setting finish/confirm operation is detected within a prescribed time from starting displaying the fourth guidance message, a back side reading operation for the next manuscript set is executed, and wherein as the input of the setting finish/confirm operation is not detected within the prescribed time from starting displaying the third guidance message, a fifth guidance message to prompt a user to select as to whether a document is to be erased is displayed, and when the user specifies the message to erase the document in response to the fifth guidance message, a reading operation at this time is terminated with errors and image data that has been read and stored till now is erased, and wherein when the message of finishing the reading of the final manuscript set is detected within a prescribed time from starting displaying the fourth guidance message or the user does not specify the message to erase the document in response to the fifth guidance message, the reading operation is finished.

21. A method for controlling an image processing apparatus, comprising:

a manuscript automatic conveying function for separating one by one a plurality of manuscripts to be read that are set on a manuscript input tray;

an image processing function for reading and storing single-sided images of the plurality of the manuscripts separated by the manuscript automatic conveying function;

a successive manuscript reading mode where a plurality of manuscript sets respectively comprising a plurality of pages of the manuscripts are sequentially put on the manuscript input tray, image data obtained by reading the manuscripts of the plurality of the manuscript sets are collected to make one single image data file; and a double-sided manuscript reading mode for reading images of two sides of the plurality of the manuscripts, wherein when both the successive manuscript reading mode and the double-sided manuscript reading mode are set, a successive manuscript reading operation is performed for back sides after a double-sided manuscript reading operation for front sides is finished, in the successive manuscript reading operation, as a manuscript reading operation for one manuscript set is finished, a next manuscript set is set and a first guidance message to prompt a user to input a message of performing a setting finish/confirm operation or finishing a reading of a final manuscript set is displayed, and then as an input of the setting finish/confirm operation is detected within a prescribed time from starting displaying the first guidance message, a reading operation for the next manuscript set is executed, and wherein when input of the setting finish/confirm operation is not detected within a prescribed time from starting displaying the first guidance message, a second guidance message to prompt a user to select as to whether a document is to be erased is displayed, and when the user specifies a message to erase the document in response to the second guidance message, a reading operation at this time is terminated with errors and image data that has been read and stored till now is erased, and wherein when the message of finishing the reading of the final manuscript set is detected within a prescribed time from starting displaying the first guidance message, back sides of an initial manuscript set are set on the manuscript input tray and a third guidance message to prompt the user with a setting finish/confirm operation is displayed, and then a back side reading operation of the double-sided manuscript reading mode is executed, in the back side reading operation, as the manuscript reading operation for back sides of the one manuscript set is finished, back sides of a next manuscript set are set and a fourth guidance message to prompt a user to input a message of performing a setting finish/confirm operation, and then as an input of the setting finish/confirm operation is detected within a prescribed time from starting displaying the fourth guidance message, a back side reading operation for the next manuscript set is executed, and wherein as the input of the setting finish/confirm operation is not detected within the prescribed time from starting displaying the third guidance message, a fifth guidance message to prompt a user to select as to whether a document is to be erased is displayed, and when the user specifies the message to erase the document in response to the fifth guidance message, a reading operation at this time is terminated with errors and image data that has been read and stored till now is erased, and wherein when the user does not specify the message to erase the document in response to the fifth guidance message, the reading operation is finished.

22. An image processing apparatus which has a successive manuscript reading mode, a double-sided manuscript reading mode, and a successive and double-sided manuscript reading mode, comprising:

manuscript conveying means for conveying one by one a plurality of manuscript sheets placed on a manuscript input tray;

manuscript reading means for reading a manuscript conveyed by the manuscript conveying means and for generating image data of each of the manuscript sheets;

displaying means for displaying guidance messages;

storing means for storing image data;

controlling means for controlling the manuscript reading means to read first and second surfaces of a plurality of manuscript sheet sets within a predetermined time interval between successive two manuscript sets, storing a plurality of image data sets sequentially obtained by the manuscript reading means into the storing means, and combining the plurality of image data sets into a single image file, when the successive reading mode, or the double-sided manuscript reading mode is selected and a plurality of manuscript are placed one after another on the manuscript input tray within the predetermined time interval.

23. The image processing apparatus of claim 22, wherein the first reading operation starts reading images of the first surfaces of a subsequent manuscript sheet set upon a detection of a placement of the subsequent manuscript sheet set on the manuscript input tray within the predetermined time interval after a completion of reading the images of the first surfaces of the present manuscript sheet set followed by the subsequent manuscript sheet set, and said second reading operation starts reading the images of the second surfaces of the plurality of manuscript sheet sets when the placement of the subsequent manuscript sheet is not detected within the predetermined time interval after the completion of reading the images of the first surfaces of the present manuscript sheet set, and wherein the second reading operation starts reading the images of the second surfaces of a subsequent manuscript sheet set upon a detection of a placement of the subsequent manuscript sheet set on the manuscript input tray within a predetermined time interval after a completion of reading the images of the second surfaces of a present manuscript sheet set followed by the subsequent manuscript sheet set.

* * * * *